US012523663B2

(12) United States Patent
Tharaux et al.

(10) Patent No.: US 12,523,663 B2
(45) Date of Patent: Jan. 13, 2026

(54) USE OF CD9 AS A BIOMARKER AND AS A BIOTARGET IN GLOMERULONEPHRITIS OR GLOMERULOSCLEROSIS

(71) Applicants: INSERM (INSTITUT NATIONAL DE LA SANTÉ ET DE LA RECHERCHE MÉDICALE), Paris (FR); SORBONNE UNIVERSITÉ, Paris (FR); UNIVERSITÉ DE PARIS, Paris (FR)

(72) Inventors: Pierre-Louis Tharaux, Paris (FR); Carole Henique-Greciet, Paris (FR); Martin Flamant, Paris (FR)

(73) Assignees: INSERM (INSTITUT NATIONAL DE LA SANTÉ ET DE LA RESCHERCHE MÉDICALE), Paris (FR); SORBONNE UNIVERSITÉ, Paris (FR); UNIVERSITÉ DE PARIS, Paris (FR)

( * ) Notice: Subject to any disclaimer, the term of this patent is extended or adjusted under 35 U.S.C. 154(b) by 1076 days.

(21) Appl. No.: 17/616,497

(22) PCT Filed: Jun. 3, 2020

(86) PCT No.: PCT/EP2020/065367
§ 371 (c)(1),
(2) Date: Dec. 3, 2021

(87) PCT Pub. No.: WO2020/245208
PCT Pub. Date: Dec. 10, 2020

(65) Prior Publication Data
US 2022/0229072 A1  Jul. 21, 2022

(30) Foreign Application Priority Data
Jun. 4, 2019 (EP) .................................... 19305721

(51) Int. Cl.
*C07K 14/705* (2006.01)
*A61K 31/44* (2006.01)
(Continued)

(52) U.S. Cl.
CPC ......... *G01N 33/6893* (2013.01); *A61K 31/44* (2013.01); *A61K 31/506* (2013.01); *A61K 31/517* (2013.01); *A61K 39/3955* (2013.01); *A61K 47/6807* (2017.08); *C07K 14/70596* (2013.01); *C07K 16/2896* (2013.01); *C12N 15/113* (2013.01); *C12N 15/1138* (2013.01); *C12N 15/115* (2013.01); *C07K 2318/00* (2013.01); *C07K 2319/00* (2013.01); *C12N 2310/11* (2013.01); *C12N 2310/13* (2013.01); *C12N 2310/14* (2013.01); *C12N 2310/16* (2013.01); *C12N 2310/17* (2013.01); *C12N 2310/20* (2017.05);
(Continued)

(58) Field of Classification Search
CPC .......... C07K 14/70596; C07K 16/2896; C07K 2319/00; C07K 2318/00; C12N 15/113; C12N 15/1138; C12N 15/115; C12N 2310/11; C12N 2310/13; C12N 2310/14; C12N 2310/16; C12N 2310/17; C12N 2310/20; A61K 39/3955; A61K 47/6807
See application file for complete search history.

(56) References Cited

U.S. PATENT DOCUMENTS

| 2004/0136985 A1* | 7/2004 | Jennings | .......... C07K 14/70596 424/144.1 |
| 2011/0008350 A1* | 1/2011 | De Strooper | ...... C12N 15/1138 424/139.1 |

(Continued)

FOREIGN PATENT DOCUMENTS

| WO | 01/64200 A2 | 9/2001 |
| WO | 2008/053270 A2 | 5/2008 |

(Continued)

OTHER PUBLICATIONS

Chirunomula et al. Crescentic Glomerulonephritis With Ribbon-like Immunofluorescence Pattern. Am J Kidney Dis 54(2): 381-384, 2009.*
Cook et al. Identification of CD9 extracellular domains important in regulation of CHO cell adhesion to fibronectin and fibronectin pericellular matrix assembly. Blood 100: 4502-4511, 2002.*
Lazareth et al. Tetraspanin CD9 expression in parietal epithelial cells drives glomerular injury during crescentic rapidly progressive glomerulonephritis. Rheumatol 58(Suppl 2): 201, Mar. 2019.*
Liu et al. Tetraspanin CD9 regulates invasion during mouse embryo implantation. J Mol Endocrinol 36: 121-130, 2006.*
Qi et al. Human and mouse mast cells use the tetraspanin CD9 as an alternate interleukin-16 receptor. Blood 107(1): 135-142, 2006.*
Rubinstein et al. CD9, but not other tetraspans, associates with the B1 integrin precursor. Eur J Immunol 27: 1919-1927, 1997.*

(Continued)

*Primary Examiner* — Bridget E Bunner
(74) *Attorney, Agent, or Firm* — WCF IP

(57) ABSTRACT

The mechanisms driving the development of extracapillary lesions in focal segmental glomerulosclerosis (FSGS) and crescentic glomerulonephritis (CGN) remain poorly understood. A key question is how parietal epithelial cells (PECs) invade glomerular capillaries, thereby promoting injury and kidney failure. Here the inventors show that expression of the tetraspanin CD9 increases markedly in PECs in mouse models of CGN and FSGS, and in kidneys from individuals diagnosed with these diseases. Cd9 gene targeting in PECs prevents glomerular damage in CGN and FSGS mouse models. Mechanistically, CD9 deficiency prevents the oriented migration of PECs into the glomerular tuft and their acquisition of CD44 and β1 integrin expression. These findings highlight a critical role for de novo expression of CD9 as a common pathogenic switch driving the PEC phenotype in CGN and FSGS, while offering a potential therapeutic avenue to treat these conditions. Accordingly, CD9 represents a reliable biomarker and as well as a biotargets in glomerulonephritides.

7 Claims, 5 Drawing Sheets

Figures 2A, 2B:
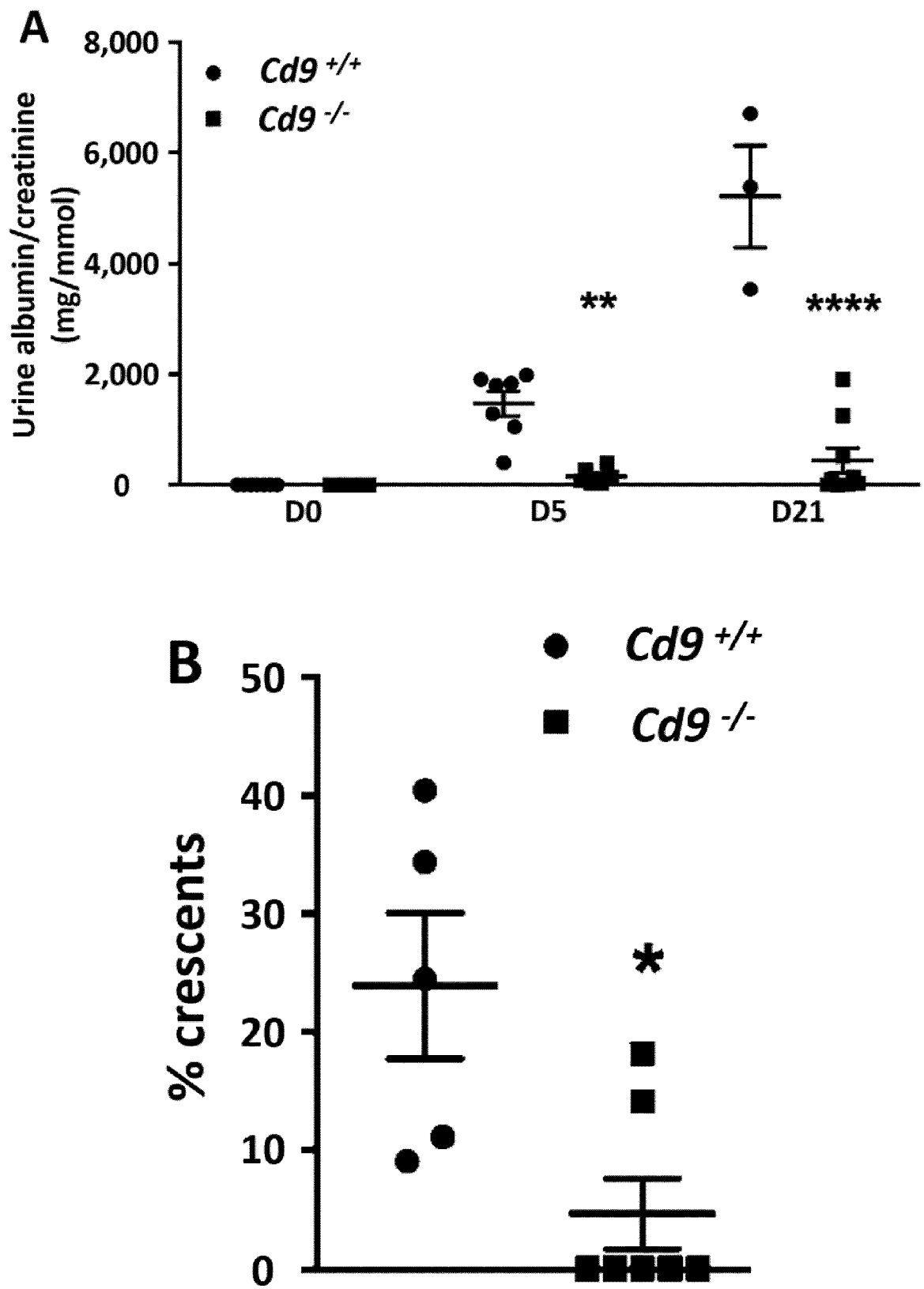

Specification includes a Sequence Listing.

(51) Int. Cl.

| | | |
|---|---|---|
| A61K 31/506 | (2006.01) | |
| A61K 31/517 | (2006.01) | |
| A61K 39/395 | (2006.01) | |
| A61K 47/68 | (2017.01) | |
| C07K 16/28 | (2006.01) | |
| C12N 15/113 | (2010.01) | |
| C12N 15/115 | (2010.01) | |
| G01N 33/68 | (2006.01) | |

(52) U.S. Cl.
CPC ............ G01N 2333/70596 (2013.01); G01N 2800/347 (2013.01); G01N 2800/50 (2013.01)

(56) References Cited

U.S. PATENT DOCUMENTS

| | | | |
|---|---|---|---|
| 2014/0141986 A1* | 5/2014 | Spetzler | G01N 33/50 435/7.1 |
| 2019/0023803 A1* | 1/2019 | Spits | C07K 16/2818 |
| 2021/0311061 A1* | 10/2021 | Alberti | A61K 39/39558 |

FOREIGN PATENT DOCUMENTS

| | | |
|---|---|---|
| WO | 2013/174834 A1 | 11/2013 |
| WO | 2016/166357 A2 | 10/2016 |

OTHER PUBLICATIONS

Shallal et al. CD9 expression enhances the susceptibility of myeloma cell lines to cell-mediated cytolysis. Blood 96: 224-233, 2000.*

Tang et al. Downregulation of CD9 promotes pancreatic cancer growth and metastasis through upregulation of epidermal growth factor on the cell surface. Oncol Reports 34: 350-358, 2015.*

Tsukamoto et al. Tetraspanin CD9 modulates ADAM17-mediated shedding of LR11 in leukocytes. Exp Mol Med 46: e89, 2014 (9 total pages).*

Cook et al. The Tetraspanin CD9 Influences the Adhesion, Spreading, and Pericellular Fibronectin Matrix Assembly of Chinese Hamster Ovary Cells on Human Plasma Fibronectin. Exp Cell Res 251: 356-371, 1999.*

Horvath et al. CD19 Is Linked to the Integrin-associated Tetraspans CD9, CD81, and CD82. J Biol Chem 273(46): 30537-30543, 1998.*

Brosseau et al: "CD9 Tetraspanin: A New Pathway for the Regulation of Inflammation?" Frontier in Immunology, vol. 9, p. 2316, Oct. 9, 2018.

Caplan et al: "Tetraspan proteins: regulators of renal structure and function :", Current Opinion in Nephrlogy & Hypertension, vol. 16, No. 4, p. 353-358, Jul. 1, 2007.

Lazareth et al: "The tetraspanin CD9 controls migration and proliferation of parietal epithelial cells and glomerular disease progression", Nature Communications, vol. 10, No. 1, p. 3303, Jul. 24, 2019.

* cited by examiner

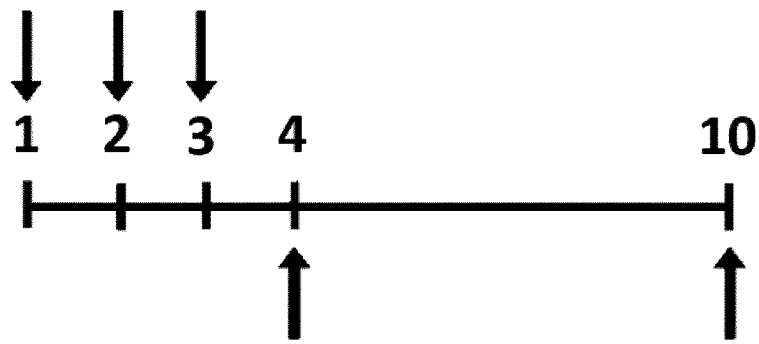
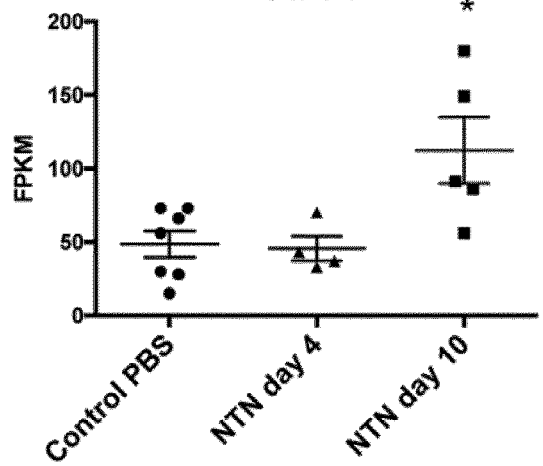
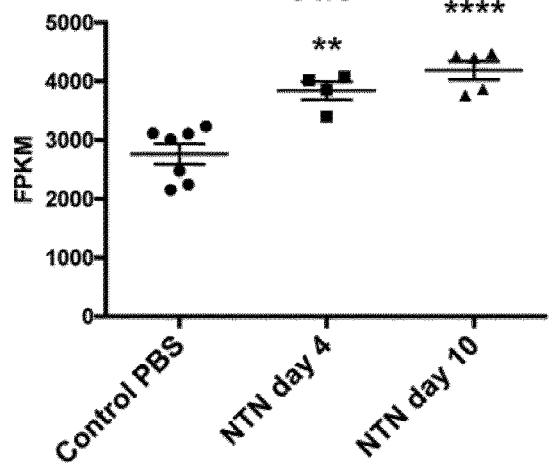
Figure 1A and 1B

SEQUENCE LISTING

```
<160> NUMBER OF SEQ ID NOS: 1

<210> SEQ ID NO 1
<211> LENGTH: 228
<212> TYPE: PRT
<213> ORGANISM: Homo sapiens

<400> SEQUENCE: 1

Met Pro Val Lys Gly Gly Thr Lys Cys Ile Lys Tyr Leu Leu Phe Gly
1               5                   10                  15

Phe Asn Phe Ile Phe Trp Leu Ala Gly Ile Ala Val Leu Ala Ile Gly
            20                  25                  30

Leu Trp Leu Arg Phe Asp Ser Gln Thr Lys Ser Ile Phe Glu Gln Glu
        35                  40                  45

Thr Asn Asn Asn Ser Ser Phe Tyr Thr Gly Val Tyr Ile Leu Ile
    50                  55                  60

Gly Ala Gly Ala Leu Met Met Leu Val Gly Phe Leu Gly Cys Cys Gly
65                  70                  75                  80

Ala Val Gln Glu Ser Gln Cys Met Leu Gly Leu Phe Gly Phe Leu
                85                  90                  95

Leu Val Ile Phe Ala Ile Glu Ile Ala Ala Ala Ile Trp Gly Tyr Ser
                100                 105                 110

His Lys Asp Glu Val Ile Lys Glu Val Gln Glu Phe Tyr Lys Asp Thr
            115                 120                 125

Tyr Asn Lys Leu Lys Thr Lys Asp Glu Pro Gln Arg Glu Thr Leu Lys
        130                 135                 140
```

```
Ala Ile His Tyr Ala Leu Asn Cys Cys Gly Leu Ala Gly Gly Val Glu
145                 150                 155                 160

Gln Phe Ile Ser Asp Ile Cys Pro Lys Lys Asp Val Leu Glu Thr Phe
                165                 170                 175

Thr Val Lys Ser Cys Pro Asp Ala Ile Lys Glu Val Phe Asp Asn Lys
                180                 185                 190

Phe His Ile Ile Gly Ala Val Gly Ile Gly Ile Ala Val Val Met Ile
            195                 200                 205

Phe Gly Met Ile Phe Ser Met Ile Leu Cys Cys Ala Ile Arg Arg Asn
        210                 215                 220

Arg Glu Met Val
225
```

USE OF CD9 AS A BIOMARKER AND AS A BIOTARGET IN GLOMERULONEPHRITIS OR GLOMERULOSCLEROSIS

FIELD OF THE INVENTION

The present invention is in the field of medicine, in particular in the field of nephrology.

BACKGROUND OF THE INVENTION

Necrotizing crescentic glomerulonephritis (CGN) and focal segmental glomerulosclerosis (FSGS) are life-threatening diseases leading to irreversible renal failure. Over the past years, increasing evidence supports the notion that glomerular parietal epithelial cells (PEC) are implicated in the formation of crescents in CGN and in glomerular scarring during FSGS[1,2,3]. In these two diseases, the common feature is the invasion of the glomerulus, the blood-filtering unit of the kidney, by PECs leading to its destruction. However, the mechanisms underlying the change in PEC phenotype remain unclear, as do those driving their oriented migration towards the glomerular tuft and their increased capacity to proliferate and form hypercellular and sclerotic lesions.

CD9 is a glycoprotein receptor belonging to tetraspanin family having molecular weight about 24-27 kD and is known to regulate signal transduction events playing important roles in development, activity, growth and motility of a cell. In addition, CD9 is known being capable of triggering platelet activation and aggregation, which regulate cell attachment (Anton, E. S., et al., J. Neurosci. 15:584-595, 1995) and cell migration (Klein-Soyer, C., et al., Arterioscler Thromb Vasc Biol. 20:360-369, 2000). Moreover, it is known to be involved in various cellular phenomena such as promotion of muscle cell fusion and myotube maintenance. CD9 has been also extensively studied in cancer, where it facilitates proliferation, migration, adhesion and survival through the organization of plasma membrane microdomains[4,5]. However, the role of CD9 in glomerular parietal epithelial cells (PEC) has never been investigated.

SUMMARY OF THE INVENTION

As defined in the claims, the present invention relates to methods of diagnosing and treating a glomerulonephritis.

DETAILED DESCRIPTION OF THE INVENTION

The mechanisms driving the development of extracapillary lesions in focal segmental glomerulosclerosis (FSGS) and crescentic glomerulonephritis (CGN) remain poorly understood. A key question is how parietal epithelial cells (PECs) invade glomerular capillaries, thereby promoting injury and kidney failure. Here the inventors show that expression of the tetraspanin CD9 increases markedly in PECs in mouse models of CGN and FSGS, and in kidneys from individuals diagnosed with these diseases. Cd9 gene targeting in PECs prevents glomerular damage in CGN and FSGS mouse models. Mechanistically, CD9 deficiency prevents the oriented migration of PECs into the glomerular tuft and their acquisition of CD44 and $\beta1$ integrin expression. These findings highlight a critical role for de novo expression of CD9 as a common pathogenic switch driving the PEC phenotype in CGN and FSGS, while offering a potential therapeutic avenue to treat these conditions.

Diagnosis:

The first object of the present invention relates to a method of determining whether a subject has or is at risk of having of a glomerulonephritis or glomerulosclerosis comprising detecting the presence or absence of CD9 in a sample obtained from the subject wherein the presence of CD9 indicates that the subject has or is at risk of having a glomerulonephritis or glomerulosclerosis.

As used herein, the term "glomerulonephritis" encompasses a class of kidney diseases, which can be broken into sub-class of extracapillary proliferative diseases and non-extracapillary proliferative diseases. As the names suggest, "proliferative" diseases include forms of glomerulonephritis in which there is a significant increase in the number of cells in the glomerulus, while "non-proliferative" diseases include forms of glomerulonephritis in which such an increase in cell numbers is not present.

As used herein, the term "extracapillary" indicates abnormal pathogenic phenotype of epithelial cells (podocytes and mostly parietal epithelial cells) that are outside the glomerular capillaries but still inside the glomerular chamber (Bowman's capsule). Such extracapillary lesions include fibrous synechiae (that is, cellular adhesions containing extracellular matrix) between the glomerular tuft and Bowman's capsule, epithelial cell hypertrophy and hyperplasia, epithelial proliferation (Jennette J C, Olson J L, Schwartz M M et al. Focal segmental glomerulosclerosis. Heptinstall's Pathology of the Kidney. 6th edn. Lippincott Williams and Wilkins: Philadelphia, Pa., 2007 pp 159-175. Common histological patterns in glomerular epithelial cells in secondary focal segmental glomerulosclerosis. Kuppe C, Gröne HJ, Ostendorf T, van Kuppevelt T H, Boor P, Floege J, Smeets B, Moeller M J. Kidney Int. 2015; 88(5):990-8. doi: 10.1038/ki.2015.116. Epub 2015 Apr. 8. PMID: 25853334).

The method of the present invention is particular suitable for determining whether a subject has or is at risk of having of an extracapillary proliferative disease.

Exemplary extracapillary proliferative diseases include crescentic glomerulonephritis complicating IgA nephropathy or post-infectious glomerulonephritis or immune-complex diseases or ANCA-associated vasculitides or anti-GBM (glomerular basement membrane) disease. Exemplary extracapillary diseases also include focal segmental glomerulosclerosis (FSGS), and collapsing glomerulopathy. FSGS can be primary or secondary, including its forms complicating diabetic nephropathy, morbid obesity, sickle cell disease, ApoL1-associated FSGS, congenital or acquired oligonephronia, genetic or autoimmune kidney diseases. Exemplary non-proliferative diseases include minimal change disease, thin basement membrane disease, amyloidosis and membranous glomerulonephritis.

In some embodiments, detecting CD9 in a sample obtained from the subject is particular suitable for determining whether a subject has or is at risk of having crescentic glomerulonephritis.

As used herein, the term "crescentic glomerulonephritis", "CGN", or "rapidly progressive glomerulonephritis (RPGN)" should be understood to mean severe glomerular inflammation resulting in destruction of the glomerular tuft and accumulation of inflammatory cells around the tuft in the shape of a crescent. Flare of CGN indicates recurrence of CGN after a period of time in an individual known to have either prior CGN or a systemic autoimmune disease (such as ANCA vasculitis or lupus) in which one may expect CGN as part of the disease. The terms "crescentic glomerulonephritis (CGN)" and "rapidly progressive glomerulonephritis (RPGN)" may be used interchangeably.

In some embodiments, detecting CD9 in a sample obtained from the subject is particular suitable for determining whether a subject has or is at risk of having focal segmental glomerulosclerosis.

As used herein, the term "focal segmental glomerulosclerosis" or "FSGS" has its general meaning in the art and is used to describe both a disease characterized by primary podocyte injury, and a lesion that occurs secondarily in any type of chronic kidney disease (CKD). In practical terms, FSGS is classified as primary or secondary depending on whether the aetiology is identified or not. Classically, 'glomerulosclerosis' is used to describe a lesion of obliteration of capillary lumina by matrix. The focal distribution of sclerosis (involving some, but not all, glomeruli) and the segmental pattern (affecting only a portion of the glomerular tuft) distinguishes scarring related to specific diseases from nonspecific global sclerosis (that is, sclerosis of an entire tuft) that can occur at any age and increases with ageing. However, a focal and segmental pattern of scarring is not unique to diseases with primary podocyte injury, and some of these diseases, such as HIV-associated nephropathy, show alternate light microscopic patterns of lesions, such as collapse of the tuft and overlying cell hyperplasia. The spectrum of segmental lesions is caused by a variety of genetic risk factors and insults, such as circulating factors, infections, drug use and secondary maladaptive responses.

As used herein, the term "risk" in the context of the present invention, relates to the probability that an event will occur over a specific time period and can mean a subject's "absolute" risk or "relative" risk. Absolute risk can be measured with reference to either actual observation post-measurement for the relevant time cohort, or with reference to index values developed from statistically valid historical cohorts that have been followed for the relevant time period. Relative risk refers to the ratio of absolute risks of a subject compared either to the absolute risks of low risk cohorts or an average population risk, which can vary by how clinical risk factors are assessed. Odds ratios, the proportion of positive events to negative events for a given test result, are also commonly used (odds are according to the formula p/(1−p) where p is the probability of event and (1−p) is the probability of no event) to no-conversion. "Risk evaluation," or "evaluation of risk" in the context of the present invention encompasses making a prediction of the probability, odds, or likelihood that an event or disease state may occur, the rate of occurrence of the event or conversion from one disease state to another. Risk evaluation can also comprise prediction of future clinical parameters, traditional laboratory risk factor values, or other indices of relapse, either in absolute or relative terms in reference to a previously measured population. The methods of the present invention may be used to make continuous or categorical measurements of the risk of conversion, thus diagnosing and defining the risk spectrum of a category of subjects defined as being at risk of conversion. In the categorical scenario, the invention can be used to discriminate between normal and other subject cohorts at higher risk. In some embodiments, the present invention may be used so as to discriminate those at risk from normal.

In some embodiments, the method of diagnosing described herein is applied to a subject who presents symptoms of glomerulonephritis without having undergone the routine screening to rule out all possible causes for glomerulonephritis. The methods described herein can be part of the routine set of tests performed on a subject who presents symptoms of glomerulonephritis such as proteinuria (large amounts of protein in the urine), hematuria, reduced glomerular filtration rate, hypoproteinemia and edema.

In some embodiments, the method of the present invention is particularly suitable for the early diagnosis of a glomerulonephritis with extracapillary involvement (e.g. an extracapillary proliferative disease). As used herein the term "early diagnosis" refers to an early phase of establishing the existence or degree of glomerulonephritis in the subject, before a symptom or a group of symptoms appears.

The term "sample" as used herein, refers to any substance derived from a living organism. For example, a sample may be derived from blood as a urine sample, serum sample, a plasma sample, and or a whole blood sample. Alternatively, a sample may be derived from a tissue collected, for example, by a biopsy. Such a tissue sample may comprise, for example, kidney tissue (e.g. biopsies in glomeruli). In particular, the kidney tissue sample comprises glomerular parietal epithelial cells. The tissue sample can, of course, be subjected to a variety of well-known post-collection preparative and storage techniques (e.g., fixation, storage, freezing, etc.). The sample can be fresh, frozen, fixed (e.g., formalin fixed), or embedded (e.g., paraffin embedded).

In some embodiments, the glomerular expression of CD9 is detected in the sample. In some embodiments, the expression of CD9 is detected in glomerular parietal epithelial cells (PECs) as described in the EXAMPLE.

As used herein, the term "CD9" has its general meaning in the art and refers to a tetraspanin with a molecular weight of about 23-27 kDa. CD9 is also known as MRP-1, MIC3, DRAP-27 and TSPAN-29. An exemplary human amino acid sequence for CD9 is represented by SEQ ID NO:1. CD9 is ubiquitously present on the surface of many kinds of cells, including melanocytes, endothelial cells, certain types of nervous cells, musculoskeletal cells and certain types of immune cells. CD9 is also present on platelets. CD9 has four transmembrane domains, a small intracellular loop and two extracellular loops, which are referred to as the EC1 domain (amino acids 34-55 in SEQ ID NO:1) and the EC2 domain (amino acids 112-195 in SEQ ID NO:1). CD9 interacts with numerous other proteins, such as the most important integrins (Beta1 integrin), EWI proteins (EWI-2 and EWI-F), CD81, CD63 and EGFR. CD9 plays amongst other things a role in cell adhesion, proliferation and migration, including tumor proliferation and metastasis.

```
>sp|P21926|CD9_HUMAN CD9 antigen OS = Homo sapiens
OX = 9606 GN = CD9 PE = 1 SV = 4
                                         SEQ ID NO: 1
MPVKGGTKCIKYLLFGFNFIFWLAGIAVLAIGLWLRFDSQTKSIFEQETNN

NNSSFYTGVYILIGAGALMMLVGFLGCCGAVQESQCMLGLFFGFLLVIFAI

EIAAAIWGYSHKDEVIKEVQEFYKDTYNKLKTKDEPQRETLKAIHYALNCC

GLAGGVEQFISDICPKKDVLETFTVKSCPDAIKEVFDNKFHIIGAVGIGIA

VVMIFGMIFSMILCCAIRRNREMV
```

The presence of CD9 in the sample may be determined by any routine technique well known in the art.

In some embodiments, the presence of CD9 in a tissue sample (e.g. kidney) is determined by immunofluorescence (IF). Immunofluorescence is a technique where a fluorescence microscope is used to visualize targets of interest in a biological section that is affixed to a microscope slide. This technique uses the specificity of fluorescently labeled antibodies or probes that bind to specific targets within a cell, and therefore allows for the examination of the distribution of the target molecules through the tissue sample. Immunofluorescence is widely used in biological and medical sciences. Fluorescence detection in tissue samples can often, however, be hindered by the presence of strong background fluorescence. "Autofluorescence" is the general term used to distinguish background fluorescence (that can arise from a variety of sources, including aldehyde fixation, extracellular matrix components, red blood cells, lipofuscin, and the like) from the desired immunofluorescence from the fluorescently labeled antibodies or probes. The presence of CD9 may be determined by antibody-based multiplexed imaging methods such as multiplexed ion beam imaging (MIBI), imaging mass cytometry (IMC), co-detection by indexing (CODEX), DNA exchange imaging (DEI), MultiOmyx (MxIF), imaging cycler microscopy (ICM), multiplexed IHC, NanoString Digital Spatial Profiling (DSP), and tissue cyclic immunofluorescence (t-CyCIF).

In some embodiments, the presence of CD9 in a tissue sample (e.g. kidney) is determined by immunohistochemistry (IHC). Immunohistochemistry typically includes the following steps i) fixing said tissue sample with formalin, ii) embedding said tissue sample in paraffin, iii) cutting said tissue sample into sections for staining, iv) incubating said sections with the binding partner specific for the CD9 marker, v) rinsing said sections, vi) incubating said section with a biotinylated secondary antibody and vii) revealing the antigen-antibody complex with avidin-biotin-peroxidase complex. Accordingly, the tissue sample is firstly incubated the binding partners. After washing, the labeled antibodies that are bound to marker of interest are revealed by the appropriate technique, depending of the kind of label is borne by the labeled antibody, e.g. radioactive, fluorescent or enzyme label. Multiple labelling can be performed simultaneously. Alternatively, the method of the present invention may use a secondary antibody coupled to an amplification system (to intensify staining signal) and enzymatic molecules. Such coupled secondary antibodies are commercially available, e.g. from Dako, EnVision system. Counterstaining may be used, e.g. H&E, DAPI, Hoechst. Other staining methods may be accomplished using any suitable method or system as would be apparent to one of skill in the art, including automated, semi-automated or manual systems. For example, one or more labels can be attached to the antibody, thereby permitting detection of the target protein (i.e the CD9 marker). Exemplary labels include radioactive isotopes, fluorophores, ligands, chemiluminescent agents, enzymes, and combinations thereof. In some embodiments, the label is a quantum dot. Non-limiting examples of labels that can be conjugated to primary and/or secondary affinity ligands include fluorescent dyes or metals (e.g. fluorescein, rhodamine, phycoerythrin, fluorescamine), chromophoric dyes (e.g. rhodopsin), chemiluminescent compounds (e.g. luminal, imidazole) and bioluminescent proteins (e.g. luciferin, luciferase), haptens (e.g. biotin). A variety of other useful fluorescers and chromophores are described in Stryer L (1968) Science 162:526-533 and Brand L and Gohlke J R (1972) Annu. Rev. Biochem. 41:843-868. Affinity ligands can also be labeled with enzymes (e.g. horseradish peroxidase, alkaline phosphatase, beta-lactamase), radioisotopes (e.g. 3H, 14C, 32P, 35S or 125I) and particles (e.g. gold). The different types of labels can be conjugated to an affinity ligand using various chemistries, e.g. the amine reaction or the thiol reaction. However, other reactive groups than amines and thiols can be used, e.g. aldehydes, carboxylic acids and glutamine. Various enzymatic staining methods are known in the art for detecting a protein of interest. For example, enzymatic interactions can be visualized using different enzymes such as peroxidase, alkaline phosphatase, or different chromogens such as DAB, AEC or Fast Red. In other examples, the antibody can be conjugated to peptides or proteins that can be detected via a labeled binding partner or antibody. In an indirect IHC assay, a secondary antibody or second binding partner is necessary to detect the binding of the first binding partner, as it is not labeled. The resulting stained specimens may be each imaged using a system for viewing the detectable signal and acquiring an image, such as a digital image of the staining. Methods for image acquisition are well known to one of skill in the art. For example, once the sample has been stained, any optical or non-optical imaging device can be used to detect the stain or biomarker label, such as, for example, upright or inverted optical microscopes, scanning confocal microscopes, cameras, scanning or tunneling electron microscopes, canning probe microscopes and imaging infrared detectors. In some examples, the image can be captured digitally. The obtained images can then be used for quantitatively or semi-quantitatively determining the amount of the CD9 marker in the sample. Various automated sample processing, scanning and analysis systems suitable for use with immunohistochemistry are available in the art. Such systems can include automated staining and microscopic scanning, computerized image analysis, serial section comparison (to control for variation in the orientation and size of a sample), digital report generation, and archiving and tracking of samples (such as slides on which tissue sections are placed). Cellular imaging systems are commercially available that combine conventional light microscopes with digital image processing systems to perform quantitative analysis on cells and tissues, including immunostained samples. See, e.g., the CAS-200 system (Becton, Dickinson & Co.). In particular, detection can be made manually or by image processing techniques involving computer processors and software. Using such software, for example, the images can be configured, calibrated, standardized and/or validated based on factors including, for example, stain quality or stain intensity, using procedures known to one of skill in the art (see e.g., published U.S. Patent Publication No. US20100136549). The image can be quantitatively or semi-quantitatively analyzed and scored based on staining intensity of the sample. Quantitative or semi-quantitative histochemistry refers to method of scanning and scoring samples that have undergone histochemistry, to identify and quantitate the presence of the specified biomarker (i.e. the CD9 marker). Quantitative or semi-quantitative methods can employ imaging software to detect staining densities or amount of staining or methods of detecting staining by the human eye, where a trained operator ranks results numerically. For example, images can be quantitatively analyzed using a pixel count algorithms (e.g., Aperio Spectrum Software, Automated Quantitative Analysis platform (AQUA® platform), and other standard methods that measure or quantitate or semi-quantitate the degree of staining; see e.g., U.S. Pat. Nos. 8,023,714; 7,257,268; 7,219,016; 7,646,905; published U.S. Patent Publication No. US20100136549 and 20110111435; Camp et al. (2002) Nature Medicine, 8:1323-1327; Bacus et al. (1997) Analyt Quant Cytol Histol, 19:316-328). A ratio of strong positive stain (such as brown stain) to the sum of total stained area can be calculated and scored. The amount of the detected biomarker (i.e. the CD9 marker) is quantified and given as a percentage of positive pixels and/or a score. For example, the amount can be quantified as a percentage of positive pixels. In some examples, the amount is quantified as the percentage of area stained, e.g., the percentage of positive pixels. For example, a sample can have at least or about at least or about 0, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 300%, 31%, 32%, 33%, 34%, 35%, 40%, 45%, 50%, 55%, 60%, 65%, 70%, 75%, 80%, 85%, 90%, 95% or more positive pixels as compared to the total staining area. In some embodiments, a score is given to the sample that is a numerical representation of the intensity or amount of the histochemical staining of the sample, and represents the amount of target biomarker (e.g., the CD9 marker) present in the sample. Optical density or percentage area values can be given a scaled score, for example on an integer scale. Thus, in some embodiments, the method of the present invention comprises the steps consisting in i) providing one or more immunostained slices of tissue section obtained by an automated slide-staining system by using a binding partner capable of selectively interacting with the CD9 marker (e.g. an antibody as above descried), ii) proceeding to digitalisation of the slides of step a. by high resolution scan capture, iii) detecting the slice of tissue section on the digital picture iv) providing a size reference grid with uniformly distributed units having a same surface, said grid being adapted to the size of the tissue section to be analyzed, and v) detecting, quantifying and measuring intensity of stained cells in each unit whereby the number or the density of cells stained of each unit is assessed.

In some embodiments, the presence of CD9 in the sample is determined at nucleic acid level. Typically, the level of a gene may be determined by determining the quantity of mRNA encoding for CD9. Methods for determining the quantity of mRNA are well known in the art. For example, the nucleic acid contained in the samples (e.g., cell or tissue prepared from the subject) is first extracted according to standard methods, for example using lytic enzymes or chemical solutions or extracted by nucleic-acid-binding resins following the manufacturer's instructions. The extracted mRNA is then detected by hybridization (e. g., Northern blot analysis, in situ hybridization) and/or amplification (e.g., RT-PCR). Other methods of Amplification include ligase chain reaction (LCR), transcription-mediated amplification (TMA), strand displacement amplification (SDA) and nucleic acid sequence based amplification (NASBA). Typically, the nucleic acid probes include one or more labels, for example to permit detection of a target nucleic acid molecule using the disclosed probes. In various applications, such as in situ hybridization procedures, a nucleic acid probe includes a label (e.g., a detectable label). A "detectable label" is a molecule or material that can be used to produce a detectable signal that indicates the presence or concentration of the probe (particularly the bound or hybridized probe) in a sample. Thus, a labeled nucleic acid molecule provides an indicator of the presence or concentration of a target nucleic acid sequence (e.g., genomic target nucleic acid sequence) (to which the labeled uniquely specific nucleic acid molecule is bound or hybridized) in a sample. A label associated with one or more nucleic acid molecules (such as a probe generated by the disclosed methods) can be detected either directly or indirectly. A label can be detected by any known or yet to be discovered mechanism including absorption, emission and/or scattering of a photon (including radio frequency, microwave frequency, infrared frequency, visible frequency and ultra-violet frequency photons). Detectable labels include colored, fluorescent, phosphorescent and luminescent molecules and materials, catalysts (such as enzymes) that convert one substance into another substance to provide a detectable difference (such as by converting a colorless substance into a colored substance or vice versa, or by producing a precipitate or increasing sample turbidity), haptens that can be detected by antibody binding interactions, and paramagnetic and magnetic molecules or materials. In some embodiments, the methods of the invention comprise the steps of providing total RNAs extracted from cumulus cells and subjecting the RNAs to amplification and hybridization to specific probes, more particularly by means of a quantitative or semi-quantitative RT-PCR.

In some embodiments, the amount of CD9+ cells (e.g. PECs) is determined. In some embodiments, the co-expression of CD9 with at least one other marker selected from CD44, PDPN/podoplanin, ITGB1 HB-EGFR, and PDGFR is detected in the cells (e.g. PECs) present in the sample.

Therapy:

A further object of the present invention relates to a method of treating a glomerulonephritis in a subject in need thereof comprising administering to the subject a therapeutically effective amount of a CD9 inhibitor.

In some embodiments, the method of the present invention is particularly suitable for the treatment of an extracapillary proliferative disease.

In some embodiments, the method of the present invention is particularly suitable for the treatment of crescentic glomerulonephritis.

In some embodiments, the method of the present invention is particularly suitable for the treatment of focal segmental glomerulosclerosis.

As used herein, the term "treatment" or "treat" refer to both prophylactic or preventive treatment as well as curative or disease modifying treatment, including treatment of patient at risk of contracting the disease or suspected to have contracted the disease as well as patients who are ill or have been diagnosed as suffering from a disease or medical condition, and includes suppression of clinical relapse. The treatment may be administered to a subject having a medical disorder or who ultimately may acquire the disorder, in order to prevent, cure, delay the onset of, reduce the severity of, or ameliorate one or more symptoms of a disorder or recurring disorder, or in order to prolong the survival of a subject beyond that expected in the absence of such treatment. By "therapeutic regimen" is meant the pattern of treatment of an illness, e.g., the pattern of dosing used during therapy. A therapeutic regimen may include an induction regimen and a maintenance regimen. The phrase "induction regimen" or "induction period" refers to a therapeutic regimen (or the portion of a therapeutic regimen) that is used for the initial treatment of a disease. The general goal of an induction regimen is to provide a high level of drug to a patient during the initial period of a treatment regimen. An induction regimen may employ (in part or in whole) a "loading regimen", which may include administering a greater dose of the drug than a physician would employ during a maintenance regimen, administering a drug more frequently than a physician would administer the drug during a maintenance regimen, or both. The phrase "maintenance regimen" or "maintenance period" refers to a therapeutic regimen (or the portion of a therapeutic regimen) that is used for the maintenance of a patient during treatment of an illness, e.g., to keep the patient in remission for long periods of time (months or years). A maintenance regimen may employ continuous therapy (e.g., administering a drug at a regular intervals, e.g., weekly, monthly, yearly, etc.) or intermittent therapy (e.g., interrupted treatment, intermittent treatment, treatment at relapse, or treatment upon achievement of a particular predetermined criteria [e.g., disease manifestation, etc.]).

As used herein, the term "CD9 inhibitor" refers to a molecule that partially or fully blocks, inhibits, or neutralizes a biological activity or expression of CD9. Suitable inhibitor molecules specifically include antagonist antibodies or antibody fragments, fragments or amino acid sequence variants of native polypeptides, peptides, antisense oligonucleotides, small organic molecules, recombinant proteins or peptides, etc. A CD9 inhibitor can be a molecule of any type that interferes with the signaling associated with CD9, for example, either by decreasing transcription or translation of CD9 encoding nucleic acid, or by inhibiting or blocking CD9 activity, or both. Examples of CD9 inhibitors include, but are not limited to, antisense polynucleotides, interfering RNAs, catalytic RNAs, RNA-DNA chimeras, CD9-specific aptamers, anti-CD9 antibodies, CD9-binding fragments of anti-CD9 antibodies, CD9-binding small molecules, CD9-binding peptides, and other polypeptides that specifically bind CD9 (including, but not limited to, CD9-binding fragments of one or more CD9 ligands, optionally fused to one or more additional domains), such that the interaction between the CD9 inhibitor and CD9 results in a reduction or cessation of CD9 activity or expression. Examples of CD9 inhibitors include compounds such that the interaction between the inhibitor and upstream inducers of CD9 results in a reduction or cessation of CD9 activity or expression.

In some embodiments, the CD9 inhibitor is an anti-CD9 antibody that binds to an extracellular domain (i.e. EC1 or EC2) of CD9. In some embodiments, the antibody inhibits the binding of CD9 to ITGB1 and/or CD44.

As used herein, the term "Integrin beta-1" or "ITGB1", also known as "CD29", is a cell surface receptor that in humans is encoded by the ITGB1 gene.

As used herein, the term "CD44" has its general meaning in the art and refers to a receptor for hyaluronic acid. The term is also known as CDw44, Epican, Extracellular matrix receptor III (ECMR-III), GP90 lymphocyte homing/adhesion receptor, HUTCH-I, Heparan sulfate proteoglycan, Hermes antigen, Hyaluronate receptor, Phagocytic glycoprotein 1 (PGP-1), and Phagocytic glycoprotein I (PGP-I).

As used herein, the term "antibody" as includes but is not limited to polyclonal, monoclonal, humanized, chimeric, Fab fragments, Fv fragments, F(ab') fragments and F(ab')2 fragments, as well as single chain antibodies (scFv), fusion proteins and other synthetic proteins which comprise the antigen-binding site of the antibody. Antibodies can be made by the skilled person using methods and commercially available services and kits known in the art. Methods of preparation of monoclonal antibodies are well known in the art and include hybridoma technology and phage display technology. Further antibodies suitable for use in the present disclosure are described, for example, in the following publications: Antibodies A Laboratory Manual, Second edition. Edward A. Greenfield. Cold Spring Harbor Laboratory Press (Sep. 30, 2013); Making and Using Antibodies: A Practical Handbook, Second Edition. Eds. Gary C. Howard and Matthew R. Kaser. CRC Press (Jul. 29, 2013); Antibody Engineering: Methods and Protocols, Second Edition (Methods in Molecular Biology). Patrick Chames. Humana Press (Aug. 21, 2012); Monoclonal Antibodies: Methods and Protocols (Methods in Molecular Biology). Eds. Vincent Ossipow and Nicolas Fischer. Humana Press (Feb. 12, 2014); and Human Monoclonal Antibodies: Methods and Protocols (Methods in Molecular Biology). Michael Steinitz. Humana Press (Sep. 30, 2013)).

Anti-CD9 antibodies are well known in the art. For instance, international patent application WO 2009/157623 describes antibody 10E4, obtained from a human phage display library, that binds amino acid positions 186-191 in SEQ ID NO:1. WO 2014/145940 describes murine CD9-specific monoclonal antibodies Z9.1 and Z9.2 which show binding to amino acid positions 112-191 in SEQ ID NO:1. WO 2013/099925 describes murine antibody CD9-12A12, which binds amino acid positions 112-194 in SEQ ID NO:1. WO 2004/007685 concerns antibody mAb7, which binds on amino acid positions 167-171 in SEQ ID NO:1. WO 95/033823 concerns murine monoclonal antibody ES5.2D8 which binds a sequence located between amino acid positions 31 and 37 in SEQ ID NO:1. European patent EP 0508417 claims murine antibodies against amino acid sequences of CD9, which sequences are selected from amino acid positions 35-60, 113-142, 131-166 and 163-191 in SEQ ID NO:1. Other CD9-specific antibodies known in the art are murine antibodies ALB6 and HI9a. WO2017119811 describes an antibody, or functional part or functional equivalent thereof, that is specific for an epitope of CD9 comprising at least one amino acid selected from the group consisting of K169, D171, V172 and L173 in SEQ ID NO:1.

In some embodiments, the CD9 inhibitor would prevent or reverse the induction of CD9 expression by modulating the signalling pathways leading to its pathogenic abundance. In particular, the CD9 inhibitor targets and blocks the signalling pathways triggering or sustaining CD9 expression in glomerular parietal epithelial cells (PECs).

In some embodiments, the CD9 inhibitor is an inhibitor of CD9 expression. An "inhibitor of expression" refers to a natural or synthetic compound that has a biological effect to inhibit the expression of a gene. In some embodiments, said inhibitor of gene expression is a siRNA, an antisense oligonucleotide or a ribozyme. For example, anti-sense oligonucleotides, including anti-sense RNA molecules and anti-sense DNA molecules, would act to directly block the translation of CD9 mRNA by binding thereto and thus preventing protein translation or increasing mRNA degradation, thus decreasing the level of CD9, and thus activity, in a cell. For example, antisense oligonucleotides of at least about 15 bases and complementary to unique regions of the mRNA transcript sequence encoding CD9 can be synthesized, e.g., by conventional phosphodiester techniques. Methods for using antisense techniques for specifically inhibiting gene expression of genes whose sequence is known are well known in the art (e.g. see U.S. Pat. Nos. 6,566,135; 6,566,131; 6,365,354; 6,410,323; 6,107,091; 6,046,321; and 5,981,732). Small inhibitory RNAs (siRNAs) can also function as inhibitors of expression for use in the present invention. CD9 gene expression can be reduced by contacting a patient or cell with a small double stranded RNA (dsRNA), or a vector or construct causing the production of a small double stranded RNA, such that CD9 gene expression is specifically inhibited (i.e. RNA interference or RNAi). Antisense oligonucleotides, siRNAs, shRNAs and ribozymes of the invention may be delivered in vivo alone or in association with a vector. In its broadest sense, a "vector" is any vehicle capable of facilitating the transfer of the antisense oligonucleotide, siRNA, shRNA or ribozyme nucleic acid to the cells and typically cells expressing CD9. Typically, the vector transports the nucleic acid to cells with reduced degradation relative to the extent of degradation that would result in the absence of the vector. In general, the vectors useful in the invention include, but are not limited to, plasmids, phagemids, viruses, other vehicles derived from viral or bacterial sources that have been manipulated by the insertion or incorporation of the antisense oligonucleotide, siRNA, shRNA or ribozyme nucleic acid sequences. Viral vectors are a preferred type of vector and include, but are not limited to nucleic acid sequences from the following viruses: retrovirus, such as moloney murine leukemia virus, harvey murine sarcoma virus, murine mammary tumor virus, and rous sarcoma virus; adenovirus, adeno-associated virus; SV40-type viruses; polyoma viruses; Epstein-Barr viruses; papilloma viruses; herpes virus; vaccinia virus; polio virus; and RNA virus such as a retrovirus. One can readily employ other vectors not named but known to the art. In some embodiments, the inhibitor of expression is an endonuclease. In a particular embodiment, the endonuclease is CRISPR-cas. In some embodiment, the endonuclease is CRISPR-cas9, which is from *Streptococcus pyogenes*. The CRISPR/Cas9 system has been described in U.S. Pat. No. 8,697,359 B1 and US 2014/0068797. In some embodiment, the endonuclease is CRISPR-Cpf1, which is the more recently characterized CRISPR from Provotella and *Francisella* 1 (Cpf1) in Zetsche et al. ("Cpf1 is a Single RNA-guided Endonuclease of a Class 2 CRISPR-Cas System (2015); Cell; 163, 1-13).

A further object relates to a method of treating a subject determined as having or being at risk of having a glomerulonephritis or glomerulosclerosis by the diagnostic method of the present invention comprising administering to the subject a therapeutically effective amount of a kinase inhibitor.

In some embodiments, the kinase inhibitor may target PDGFR (Platelet-derived growth factor receptor, also known as Platelet-derived growth factor receptor, CD140 antigen-like family member; UniprotKB—P16234 (PGFRA) P09619 (PGFRB)). The PDGFR kinase inhibitors are well-known. For instance, reviews are published disclosing such PDGFR kinase inhibitors (Roskoski, Pharmacol Res. 2018 March; 129:65-83; Andrick et Gandhi, Ann Pharmacother. 2017 December; 51(12):1090-1098; Khalique et Banerjee, Expert Opin Investig Drugs. 2017 September; 26(9):1073-1081; Miyamoto et al, Jpn J Clin Oncol. 2018 Jun. 1; 48(6):503-513; Gallogly et Lazarus, J Blood Med. 2016 Apr. 19; 7:73-83; Pitoia et Jerkovich, Drug Des Devel Ther. 2016 Mar. 11; 10:1119-31; Chen et Chen, Drug Des Devel Ther. 2015 Feb. 9; 9:773-9), the disclosure of which being incorporated herein by reference. Patent applications also disclose PDGFR kinase inhibitors, for instance and non-exhaustively WO11119894, WO08016192, WO07004749, WO03077892, WO03077892, WO0164200, WO0125238, WO0172711, WO0172758, WO9957117, and WO9928304, the disclosure of which being incorporated herein by reference. In some embodiments, the PDGFR kinase inhibitor is selected from the group consisting of imatinib, regorafenib, sunitinib, sorafenib, pazopanib, Telatinib, bosutinib, nilotinib, ponatinib, and lenvatinib.

The kinase inhibitor may target EGFR (epidermal growth factor receptor), also called ErbB-1 and HER1 (see UniprotKB—P00533). The EGFR kinase inhibitors are well-known. For instance, reviews are published disclosing such EGFR kinase inhibitors (Expert Opinion on Therapeutic Patents December 2002, Vol. 12, No. 12, Pages 1903-1907; Kane, Expert Opinion on Therapeutic Patents February 2006, Vol. 16, No. 2, Pages 147-164; Traxler, Expert Opinion on Therapeutic Patents December 1998, Vol. 8, No. 12, Pages 1599-1625; Singh et al, Mini Rev Med Chem. 2016; 16(14):1134-66; Cheng et al, Curr Med Chem. 2016; 23(29):3343-3359; Milik et al, Eur J Med Chem. 2017 Dec. 15; 142:131-151.; Murtuza et al, Cancer Res. 2019 Feb. 15; 79(4):689-698; Tan et al, Onco Targets Ther. 2019 Jan. 18; 12:635-645; Roskoski, Pharmacol Res. 2019 January; 139:395-411; Mountzios, Ann Transl Med. 2018 April; 6(8):140; Tan et al, Mol Cancer. 2018 Feb. 19; 17(1):29), the disclosure of which being incorporated herein by reference. Patent applications also disclose EGFR kinase inhibitors, for instance and non-exhaustively WO19010295, WO19034075, WO18129645, WO18108064, WO18050052, WO18121758, WO18218963, WO17114383, WO17049992, WO17008761, WO17015363, WO17016463, WO17117680, WO17205459, WO16112847, WO16054987, WO16070816, WO16079763, WO16125186, WO16123706, WO16050165, WO15081822, WO12167415, WO13138495, WO10129053, WO10076764, WO09143389, WO05065687, WO05018677, WO05027972, WO04011461, WO0134574, the disclosure of which being incorporated herein by reference.

In some embodiments, the kinase inhibitor may target EGFR (epidermal growth factor receptor), also called ErbB-1 and HER1 (see UniprotKB—P00533). The EGFR kinase inhibitors are well-known. For instance, reviews are published disclosing such EGFR kinase inhibitors (Expert Opinion on Therapeutic Patents December 2002, Vol. 12, No. 12, Pages 1903-1907; Kane, Expert Opinion on Therapeutic Patents February 2006, Vol. 16, No. 2, Pages 147-164; Traxler, Expert Opinion on Therapeutic Patents December 1998, Vol. 8, No. 12, Pages 1599-1625; Singh et al, Mini Rev Med Chem. 2016; 16(14):1134-66; Cheng et al, Curr Med Chem. 2016; 23(29):3343-3359; Milik et al, Eur J Med Chem. 2017 Dec. 15; 142:131-151.; Murtuza et al, Cancer Res. 2019 Feb. 15; 79(4):689-698; Tan et al, Onco Targets Ther. 2019 Jan. 18; 12:635-645; Roskoski, Pharmacol Res. 2019 January; 139:395-411; Mountzios, Ann Transl Med. 2018 April; 6(8):140; Tan et al, Mol Cancer. 2018 Feb. 19; 17(1):29), the disclosure of which being incorporated herein by reference. Patent applications also disclose EGFR kinase inhibitors, for instance and non-exhaustively WO19010295, WO19034075, WO18129645, WO18108064, WO18050052, WO18121758, WO18218963, WO17114383, WO17049992, WO17008761, WO17015363, WO17016463, WO17117680, WO17205459, WO16112847, WO16054987, WO16070816, WO16079763, WO16125186, WO16123706, WO16050165, WO15081822, WO12167415, WO13138495, WO10129053, WO10076764, WO09143389, WO05065687, WO05018677, WO05027972, WO04011461, WO0134574, the disclosure of which being incorporated herein by reference. EFGR inhibitors include, for example quinazoline EGFR inhibitors, pyrido-pyrimidine EGFR inhibitors, pyrimido-pyrimidine EGFR inhibitors, pyrrolo-pyrimidine EGFR inhibitors, pyrazolo-pyrimidine EGFR inhibitors, phenylamino-pyrimidine EGFR inhibitors, oxindole EGFR inhibitors, indolocarbazole EGFR inhibitors, phthalazine EGFR inhibitors, isoflavone EGFR inhibitors, quinalone EGFR inhibitors, and tyrphostin EGFR inhibitors. In some embodiments, the EGFR inhibitor according to the invention is selected from the group consisting of brigatinib, erlotinib, gefitinib, icotinib, lapatinib, sapitinib, vandetanib, varlitinib afatinib, canertinib, dacomitinib, neratinib, osimertinib, pelitinib, and rociletinib.

A "therapeutically effective amount" refers to an amount effective, at dosages and for periods of time necessary, to achieve a desired therapeutic result. A therapeutically effective amount of drug may vary according to factors such as the disease state, age, sex, and weight of the individual, and the ability of drug to elicit a desired response in the individual. A therapeutically effective amount is also one in which any toxic or detrimental effects of the active ingredient (e.g. the CD9 inhibitor or the kinase inhibitor) are outweighed by the therapeutically beneficial effects. The efficient dosages and dosage regimens for drug depend on the disease or condition to be treated and may be determined by the persons skilled in the art. A physician having ordinary skill in the art may readily determine and prescribe the effective amount of the pharmaceutical composition required. For example, the physician could start doses of drug employed in the pharmaceutical composition at levels lower than that required in order to achieve the desired therapeutic effect and gradually increase the dosage until the desired effect is achieved. In general, a suitable dose of a composition of the present invention will be that amount of the compound, which is the lowest dose effective to produce a therapeutic effect according to a particular dosage regimen. One of ordinary skill in the art would be able to determine such amounts based on such factors as the subject's size, the severity of the subject's symptoms, and the particular composition or route of administration selected. An exemplary, non-limiting range for a therapeutically effective amount of drug is about 0.1-100 mg/kg, such as about 0.1-50 mg/kg, for example about 0.1-20 mg/kg, such as about 0.1-10 mg/kg, for instance about 0.5, about such as 0.3, about 1, about 3 mg/kg, about 5 mg/kg or about 8 mg/kg. An exemplary, non-limiting range for a therapeutically effective amount of an antibody of the present invention is 0.02-100 mg/kg, such as about 0.02-30 mg/kg, such as about 0.05-10 mg/kg or 0.1-3 mg/kg, for example about 0.5-2 mg/kg. Administration may e.g. be intravenous, intramuscular, intraperitoneal, or subcutaneous, and for instance administered proximal to the site of the target.

Typically, the drug of the present invention (e.g. the CD9 inhibitor or the kinase inhibitor) is administered to the subject in the form of a pharmaceutical composition, which comprises a pharmaceutically acceptable carrier. Pharmaceutically acceptable carriers that may be used in these compositions include, but are not limited to, ion exchangers, alumina, aluminum stearate, lecithin, serum proteins, such as human serum albumin, buffer substances such as phosphates, glycine, sorbic acid, potassium sorbate, partial glyceride mixtures of saturated vegetable fatty acids, water, salts or electrolytes, such as protamine sulfate, disodium hydrogen phosphate, potassium hydrogen phosphate, sodium chloride, zinc salts, colloidal silica, magnesium trisilicate, polyvinyl pyrrolidone, cellulose-based substances, polyethylene glycol, sodium carboxymethylcellulose, polyacrylates, waxes, polyethylene-polyoxypropylene-block polymers, polyethylene glycol and wool fat. For use in administration to a subject, the composition will be formulated for administration to the subject. The compositions of the present invention may be administered orally, parenterally, by inhalation spray, topically, rectally, nasally, buccally, vaginally or via an implanted reservoir.

The invention will be further illustrated by the following figures and examples. However, these examples and figures should not be interpreted in any way as limiting the scope of the present invention.

FIGURES

FIG. 1: CD9 is overexpressed by glomerular cells during CGN (A) Schematic strategy to identify differentially expressed genes overtime on day 4 and 10 (arrows), in freshly isolated glomeruli from mice developing CGN upon nephrotoxic serum (NTS) or PBS injection (arrows). At day 4, no crescent has been constituted yet, whereas mice display >50% of crescentic glomeruli on day 10. (B) Relative increase in Cd44 mRNA expression is shown as a control for assessment of PEC "activation" that was detected on day 10 only. Cd9 mRNA expression was significantly higher in glomeruli during NTN on day 4 and 10 as compared with PBS-infused control mice. Data are expressed as mean of FPKM (fragments per kilobase per million reads mapped)+/−s.e.m of 4 and 7 mice per condition. t test: * $P<0.05$;  $P<0.01$; ** $P<0.0001$ for NTS-injected vs. PBS-injected mice.

FIG. 2: global genetic CD9 depletion in mice protects from nephrotoxic serum-induced CGN.

(A) Urine albumin-to-creatinine ratio in $Cd9^{-/-}$ and $Cd9^{+/+}$ mice at baseline and during NTN model. Data represent mean+/−s.e.m. of n=7 and 9 mice at baseline, n=6 and 9 mice at day 5 and n=3 and 9 mice at day 21 (no $Cd9^{-/-}$ but 7/10 $Cd9^{+/+}$ mice had from end stage kidney failure with 100% of crescentic glomeruli). Individual values are shown in dots. t test:  $P<0.01$; ** $P<0.0001$ for $Cd9^{-/-}$ vs. $Cd9^{+/+}$ mice. (B) Associated quantification of the percentage of glomeruli with crescent formation. Data represent mean+/−s.e.m. of n=5 and 7 mice per group. Individual values are shown in dots. t test: * $P<0.05$.

FIG. 3: Glomerular cells overexpress CD9 during FSGS and PEC-selective Cd9 deletion protects mice from FSGS in the DOCA-salt model.

(A) Urine albumin-to-creatinine ratio and (B) BUN in iPec-Cd9 mice during DOCA salt model (n=5 mice in placebo groups, n=10 mice in DOCA groups); ANOVA: * $P<0.05$, * $P<0.001$ and ** $P<0.0001$ between iPec-$Cd9^{wt/wt}$ and iPec-$Cd9^{lox/lox}$ mice in the DOCA-salt model; ## $P<0.01$ between W2 and W6 of DOCA treatment in iPec-$Cd9^{wt/wt}$ group. (C-E) Associated quantification of the percentage of glomeruli (C) with more than 50% of sclerosis and (D) with FSGS lesions (n=5 and 8 mice respectively in placebo and DOCA groups). * iPec-$Cd9^{wt/wt}$ vs. iPec-$Cd9^{lox/lox}$ mice in the DOCA-groups; # iPec-$Cd9^{wt/wt}$ placebo-treated vs. DOCA-treated; ANOVA: * $P<0.05$, ## $P<0.01$, * ** $P<0.001$. (E) Quantification of the percentage of glomeruli with CD44-positive PEC at W2 and W6 in iPec-$Cd9^{wt/wt}$ and iPec-$Cd9^{lox/lox}$ mice (n=4 and 8 mice respectively in placebo and DOCA groups). * iPec-$Cd9^{wt/wt}$ vs. iPec-$Cd9^{lox/lox}$ mice in the DOCA-groups; # iPec-$Cd9^{wt/wt}$ placebo-treated vs. DOCA-treated; $ iPec-$Cd9^{lox/lox}$ placebo-treated vs. DOCA-treated. ANOVA: $$$ $P<0.001$, **** and ####$P<0.0001$. (F-G) Correlation between the percentage of CD44-positive PEC and the percentage of abnormal glomeruli (F) or glomerulosclerosis score (G) in all mice.

EXAMPLE

Methods
Animals

Mice with a constitutive CD9 deficiency have been previously described[25]. For the generation of Cd9 floxed mice, we inserted on the PTV-0 vector with a floxed $Neo^r$ gene (i) 3' to the $Neo^r$ gene a 9 kb genomic fragment containing Cd9 exon 1 (starting at bp −1625 from the ATG site) and a lox site introduced at the first NheI site of Cd9 intron 1 (3.6 kb 3' from the start of the 9 kb fragment); and (ii) 5' to the $Neo^r$ gene a short arm of 787 bp. The recombination was performed in E14 ES cells. One of the selected ES clones, RH289, was transfected with the expression vector pIC-Cre[65] to remove the $Neo^r$ gene. The screening of recombinant ES clones was performed by PCR and the recombination was checked by southern blot. E14 Clone RH289-140 harboring the expected recombination was used for injection into 3.5-day-old C57BL/6 blastocysts, which were transferred into foster mothers. Chimeric males were crossed with C57Bl/6 females and heterozygous mice were intercrossed to check for normal CD9 expression of homozygous mice. Heterozygous floxed mice were backcrossed 15 times on a C57Bl/6J background. CRE recombination deletes the same genomic fragment than the constitutive Cd9 gene deletion previously reported and completely suppressed CD9 expression[25].

Mice with a specific deletion of Cd9 in platelets (PF4-Cre-Cd9) were generated by crossing homozygous Cd9 flox/flox mice with PF4-Cre mice[27]. Mice with a podocyte-specific deletion of Cd9 (Pod-Cd9) were generated by using Nphs2-Cre recombinase, which expresses CRE recombinase exclusively in podocytes s.

Mice with PEC-specific deletion of Cd9 were generated by crossing iPec-Cre positive mice, which expresses CRE-recombinase exclusively in PEC after doxycycline induction, with Cd9 floxed mice[34]. iPec-Cre mice were on a mixed background (C57BL6/J and SV129). Briefly, inducible CRE expression in PEC was generated by crossing mice with the enhanced reverse tetracycline transactivator under the control of the selective PEC promoter (pPEC-rtTA-M2 mice) with mice expressing CRE recombinase under the control of an inducible promoter (tetracycline-responsive element). Doxycycline hyclate (Sigma aldrich) was administered in drinking water for 14 days (5% sucrose and 1 mg/ml doxycycline) followed by 1 week of washout.

Age-matched littermates that had no deletion of Cd9 in any cells were considered as controls. Animals were housed under standard specific pathogen-free conditions. All animal procedures were performed in accordance with guidelines of the European Community (L358-86/609EEC), and were approved by the Institut National de la Santé et de la Recherche Médicale and the Ministry for Higher Education and Research (MESR 7646 and TARGET GLOMDIS).

Bone Marrow Transplantation

Recipient mice were exposed to 9,5 Gy Cesium 137 radiation for 10 minutes. The day after, each mouse received $10 \times 10^6$ bone marrow cells by i.v injection under isoflurane anesthesia. Mice received antibiotics treatment (Enrofloxacine 0.025%) in drinking water for 2 weeks. Chimeric mice were used 6 weeks after transplantation. Transplantation efficiency was determined to be >90% in parallel experiments.

Induction of Nephrotoxic Nephritis with Crescentic Glomerulonephritis

Nephrotoxic nephritis was induced on male mice (10-12 weeks of age) by intravenous injection of 15 µl of sheep anti-mouse glomerular basement membrane nephrotoxic serum, which was diluted with 85 µL of sterile PBS. Serum injections were repeated twice (on days 2 and 3)[66]. Mice were killed after 21 days.

DOCA-Salt and Nephron Reduction Model of FSGS 10-to-15 week-old male mice underwent unilateral left nephrectomy via flank incision under isoflurane anesthesia and received 0.1 mg/kg buprenorphine twice daily for 2 days. They were divided into 2 groups receiving either deoxycorticosterone acetate (DOCA) or placebo. DOCA pellets (50 mg of DOCA per pellet) and placebo pellets with 21-day release (Innovative Research of America) were implanted subcutaneously two weeks after uninephrectomy. A second pellet of DOCA or placebo was implanted 3 weeks after the first implant. All animals received 0.9% NaCl in drinking water ad libitum. Mice were killed after 6 weeks of DOCA or placebo treatment.

Blood Pressure Assessment

Blood pressure was measured by using tail cuff plethysmography with the BP-2000 Blood Pressure Analyzing system (Visitech system). After a week of habituation, blood pressure was assessed weakly for two consecutive days during the entire experiment time course. Values represent the mean of the two measures.

Biochemical Measurements in Blood and Urine

Urinary creatinine and BUN concentrations were analyzed by a standard colorimetric method (Olympus AU400) at the Biochemistry Laboratory of Institut Claude Bernard (IFR2, Faculté de Médecine Paris Diderot). Urinary albumin excretion was measured by using a specific ELISA for quantitative determination of albumin in mouse urine (Cell-Trend GmbH). Blood count was performed on a Hemavet counter (Drew scientific) on fresh blood after intracardiac puncture. Heparin was used as anticoagulant.

Transmission Electron Microscopy Procedure

Small pieces of renal cortex were fixed in Trump fixative (EMS) and embedded in Araldite M (Sigma Aldrich). Ultra-thin sections were counterstained with uranyl acetate and lead citrate and then examined in a JEOL 1011 transmission electron microscope with Digital Micrograph software for acquisition.

Human Tissues

Acetic acid-Formol-Alcohol-fixed, paraffin-embedded renal tissue specimens were obtained from the Pathology department of Hôpital Europeen Georges Pompidou, Assistance Publique-Hôpitaux de Paris, Paris, France. Human tissue was used after informed consent by all the patients and approval form, and kidney biopsies collection was approved by the local Ethics Committee (IRB00003888, FWA00005831). Kidney biopsy specimens were collected in compliance with all relevant ethical regulations and those with sufficient tissue for immunohistochemical evaluation after the completion of diagnosis workup were included.

Histology

Kidneys were immersed in 10% formalin and embedded in paraffin. Sections (4-µm thick) were processed for histopathology or immunohistochemistry. Sections were stained with Masson's trichrome, Periodic-Acid Schiff or red Sirius staining. For immunofluorescence, paraffin-embedded sections were stained with the following primary antibodies: rabbit anti-WT1 (Abcam, ab89901, 1:100), goat anti-PODXL (R&D systems, BAF1556, 1:200), rabbit anti-CD9 (Abcam, ab92726, 1:100), rat anti-CD44 (Abcam, ab119348, 1:100), rat anti-CD44 AF647-conjugated (Biolegend, 103018, 1:100), rabbit anti-integrin β1 (Abcam, ab179471, 1:500), goat anti-synaptopodin antibody (Santa Cruz Biotechnology; SC21537; 1:400), rabbit anti-p57 antibody (Santa Cruz Biotechnology; SC8298; Santa Cruz; 1:200), goat anti-podoplanin (R&D Systems; AF3244-SP; 1:400), mouse anti-PCNA (Abcam; ab29; 1:400), and guinea pig anti-synaptopodin (Synaptic Systems; 163004; 1:500).

The following secondary antibodies were used: donkey anti-goat IgG (H+L) AF488-conjugated antibody (Life Technologies, A-11005, 1:400), donkey anti-rabbit IgG (H+L) AF594-conjugated antibody (A-21207, Life Technologies, 1:400), donkey anti-rat IgG (H+L) AF488-conjugated antibody (A-21208, Life Technologies, 1:400), donkey anti-rabbit IgG(H+L) Cy5-conjugated antibody (Jackson Immunoresearch, 1:200). The nuclei were stained with DAPI. Photomicrographs were taken with an Axiophot Zeiss photomicroscope (Jena, Germany).

For immunohistochemistry, paraffin-embedded sections were stained with primary mouse anti-CD9 antibody for human tissues (kindly provided by Claude Boucheix and Eric Rubinstein) or rabbit anti-CD9 (Abcam, ab92726, 1:100). Sections were then incubated with Histofine® (Nichirei Biosciences, Japan) during 2 hours at room temperature. Staining was revealed with AEC reagent (DAKO), counterstained with hematoxylin QS (Vector, Burlingame, Calif.), and finalized with Permanent Aqueous Mounting Media (Innovex).

For quantification of histological lesions, an average of 40 glomerular cross-sections per mice was blindly counted for crescents in NTN model and abnormal glomeruli, sclerotic lesion above 50% of glomerulus surface and FSGS lesions in the DOCA-salt model. For red sirius quantification, automatic scanning of the whole kidney section was performed using Vectra technologies. Quantification of red Sirius area was then performed on 13 randomly chosen cortical fields per mice. Initially, podocyte number was assessed by the number of WT-1+ cells per glomerular cross-section in an average of 50 glomerular cross-sections per mice.

Model-Based Stereology

Podocyte depletion indices were assessed by the Weibel and Gomez method[67] validated by White and Bilous[68] in the kidney. This is one of the preferred methods to determine podocyte depletion parameters when limited tissue is available[69, 70]. Briefly, 1 um thick paraffin sections were cut and stained with anti-p57, anti-SNP, and anti-CD44 antibodies and conjugated with AF488, AF594 and AF647 respectively. A minimum of 10 glomerular cross-sections per mouse was systematically and randomly selected from the entire renal cortex. Images were obtained with a confocal laser microscope (LSM 710; Zeiss, Germany) running the Zen 2009 (Zeiss) software.

In order to estimate glomerular volume, podocyte number and thereby podocyte density (podocyte number divided by glomerular volume), we determined the number of podocyte nuclei per glomerular cross-section based on nuclear p57 and cytoplasmic SNP expression, total area of podocyte nuclei based on p57 expression, and glomerular tuft area. These parameters were inserted in the following formulae:

The number of podocytes per glomerulus ($N_{pod}$) was estimated by:

$$N_{pod} = N_v \times G_v$$

$N_V$ and $G_V$ represent podocyte density and glomerular volume respectively.

In order to obtain $N_V$, we used this equation:

$$N_v = \left(\frac{1}{\beta}\right) \times (N_A^3 \div V_v^{0.5})$$

$N_A$ represents the division of the number of podocyte nuclei by the glomerular tuft area. $V_V$ gives a ratio of total podocyte nuclei area over glomerular tuft area. The B coefficient of 1.55 was assuming podocyte nuclei are ellipsoids.

$G_V$ was calculated using this equation:

$$G_v = G_A^{1.5} \times (1.38 \div 1.01)$$

$G_A$ represents the glomerular tuft area, 1.38 is the sphere shape coefficient, and 1.01 is the size distribution coefficient that assumes a 10% coefficient of variation. Furthermore, total podocyte volume was obtained with the same equation:

$$P_v = P_A^{1.5} \times (1.38 \div 1.01)$$

$P_V$ represents total podocyte volume and PA the combination of nuclear (p57+) and cytoplasmic (SNP+) areas per glomerular cross-section. In order to obtain average podocyte volume, we divided total podocyte volume by total podocyte number.

During this process, glomeruli were also categorized based on the presence of CD44+ PEC, which were identified based on their anatomical location.

PEC Cell Line

Primary PEC line has been previously described[37] and were a kind gift from M Moeller. Primary PEC were cultured at 5% $CO_2$, and 37° C. in complete Endothelial cell basal medium (PromoCell) with penicillin/streptomycin 1% (Thermo Fisher Scientific) and Fetal bovine serum (FBS) 20% (Gibco) until 70% of confluence. The maintenance culture was passaged once a week by gentle trypsinization by using trysin EDTA 0.05% (Thermo Fisher Scientific).

Cell Silencing of Cd9 by Small-hairpinRNA

PECs at passage 6 were transduced with a lentivirus encoding for an anti-Cd9 small-hairpinRNA (shRNA) (sh-Cd9) or a scramble shRNA (sh-scramble) at a dose of 20 MOI (multiplicity of infection). Medium containing lentiviral particles was replaced by fresh medium after 1 day. Cells were analyzed at least 7 days post-transduction. Production of HIV1 delta U3 SIN lentiviral particles with VSV-G envelop was carried out by the VVTG facility platform (Necker faculty) by using the lentiviral vector TRC1-pLKO.1-U6-shRNACd9 (MISSION shRNA, SHCLND NM_007657, TRCN0000066393, SigmaAldrich) containing Cd9-specific shRNA or the control vector (MISSION NON-TARGET SHRNA CONTROL VECTOR, SHC002, SigmaAldrich).

Cell Adhesion Assay and Cell Surface Evaluation 20 000 PEC were plated in 6-well culture plates. Photomicrographs were taken at magnification ×1000 thirty minutes, 1, 6 and 24 hours after plating. The number of floating and adherent cells was assessed on 15 pictures (average number of cells counted per experiment n=460). Cell surface was evaluated at 24 hours of plating on an average number of 100 cells per condition by using ImageJ software.

Cell Migration in IBIDI Chambers

Unoriented migration assay was performed using IBIDI chambers (Culture-Insert 2 Well in μ-Dish 35 mm, high ibiTreat, n° 81176). After confluence was obtained, PECs were grown in ECBM without supplements with FBS 1% overnight. The insert was then removed creating a gap of 500 μm between cells. A first round of photographs was taken (H0), shortly after cells were stimulated with either ECBM without supplements with FBS 1% (control), or with HB-EGF 10 ng/mL, or with PDGF-BB 10 ng/mL. Photographs were taken every 30 min for 12 h. Areas of migration were measured by automatic quantification on NIS-Elements AR software.

Migration in PDGF Gradient Using Microfluidic Devices

The manufacture of microchannels has been previously described[71]. Briefly, we use a soft lithography technique to obtain a mold with the desired channel architecture. Polydimethylsiloxane (PDMS) is poured over the mold and cured at 70 C (data not shown). Afterwards, using plasma-bonding, the T-shape PDMS microchannel is irreversibly attached to a glass coverslip. The width of the microchannel is 100 μm.

Parietal epithelial cells are cultured in ECBM medium, 20% FBS, 1% penicillin streptomycin) at 37 C. Channels are treated with plasma-cleaner to render PDMS hydrophilic. FBS is injected into the channel one hour before cell injection and incubated at 37 C. After cells are dissociated with trypsin and resuspended in culture medium, centrifugation allows a high cell concentration (~$10^7$ cells/mL). Cells are injected into the channel and incubated at 37 C during 24 hours. The day after, cells are starved using ECBM+1% FBS overnight. Cells are used for experiment the next day. We typically perform experiments on multiple cells. The localization of the observed cells in the channel is chosen in order to maximize the gradient of growth factor. PDGF-BB is used at 20 ng/mL and HBEGF at 20 ng/mL. Growth factors are diluted in HBSS-Hepes 10 mM. Cells are observed under an Olympus IX3-CBH microscope using CellSens Dimension software. Two syringe pump driven entries are used to supply liquid flow. Flow rate is 3 μL/min allowing low Reynold's number and laminar flow.

Every observable cell was analyzed at the beginning and after 3 hours of observation. Cells were assessed for shape centroid coordinates at both time using ImageJ software. X axis is oriented in the flow and Y axis along longitudinal displacement (ie along gradient of concentration). Difference of X and Y coordinates are plotted on the graphs. For every initial position of cells (Y), the gradient of concentration could be approximated using the following equation:

$$C(Y) = \frac{C0}{2} * \text{erfc} \frac{Y}{\sqrt{2 \cdot D \cdot T}}$$

in which C0 is the initial concentration of growth factor (C0=20 ng/mL for PDGF-BB and 20 μmol/L for HB-EGF), erfc stands for complementary error function, Y is the centroid coordinate of the cell in the canal, D is the coefficient of diffusion of the growth-factor and T the time necessary for the flow to reach the X coordinate of the cell. Only cells exposed to a $$\frac{\Delta C}{C} > 100\%$$

were considered. This represent the cells localized in the centrum of the microchannel. Absolutes displacements were evaluated using the difference in X or Y between initial and final position.

Cell Apoptosis Assay

Cells viability was assessed using APC conjugated Annexin-V (ImmunoTools) combined with propidium iodide (PI)(Thermo Fisher Scientific). Cells were plated in 6-well plates during 24 hours. Cells were then trypsinized and washed in cold phosphate-buffered saline (PBS w/o $Ca^{2+}$). Supernatants were kept and included in analysis. After centrifugation, cells were then resuspended in 100 ul of Annexin-V binding buffer (BD Pharmingen) and directly stained with Annexin-V and PI at room temperature for 5 min in the dark. A control tube without Annexin-V binding buffer was used to sustain aspecific signal from final analysis. Samples were analysed on a BD LSRII flow cytometer (BD Bioscience). Data were analyzed using FlowJo software (FlowJo, LLC). Viable cells were defined as both Annexin-V and PI negative, apoptotic cells as Annexin-V positive and PI negative, necrotic cells as both Annexin-V and PI positive and all populations were expressed as percentage of total cells.

Proliferation Assay

To assess cell proliferation, we used the nuclear antigen Ki67 staining. After overnight starvation in ECBM+1% FBS, cells were treated 24 hours with PDGF-BB (10 ng/mL) or HBEGF (20 ng/mL) or corresponding controls. Cells were then trypsinized and washed in cold PBS. Supernatants were kept and included in analysis. After centrifugation, cells were permeabilized with 1 mL of ice-cold ethanol for 2 h at −20° C. Following two washes with FACS buffer (HBSS, 2% FBS and 10 mM HEPES), cells were stained for 30 min at room temperature in the dark with phycoerythrin (PE)-conjugated anti-human Ki67 mAb (clone B56) (BD Pharmingen) and washed. Samples were analyzed on a BD LSRII flow cytometer (BD Bioscience). An isotype control staining with PE mouse IgG1 was performed. Data were analyzed using FlowJo software (FlowJo, LLC).

Western Blot Analysis

PEC lysates were prepared with RIPA extraction buffer containing phosphatase inhibitors and protease inhibitors (Roche). Equal amounts of proteins were loaded onto sodium dodecyl sulfate-polyacrylamide electrophoresis gels for separation and transferred onto poly(vinylidene difluoride) membranes. The membranes were blocked with milk and probed with different antibodies: rat anti-CD9 (BD Pharminogen, 553758, 1:1000), rabbit anti-phospho-PDGF receptor-β Y1009 (Cell Signaling Technology, 4549; 1:1000), rabbit anti-PDGFRB (Cell Signaling, 3169; 1:1000), rabbit anti-integrin 81 (Millipore, 04-1109, 1:1000), rabbit anti-CASP3 (Cell Signaling Technology, 9662; 1:1000), rabbit anti-phospho EGFR Y1068 (Cell Signaling Technology, 2234; 1:1000), rabbit anti EGFR (Cell Signaling Technology, 2232; 1:1000), rabbit anti-phospho-FAK Y397 (Cell Signaling 3283, 1:1000), rabbit anti-FAK (Millipore, 06-543,1:1000). Membranes were then probed with horseradish peroxidase-conjugated secondary antibodies (Cell Signaling Technology, 7074 and 7076; 1:2000; Jackson Immunoresearch, 706-036-148; 1:1000) and bands were visualized by enhanced chemiluminescence (Clarity Western ECL substrate; Bio-Rad, 170-5061). A LAS-4000 imaging system (Fuji, LAS4000, Burlington, N.J., USA) was used to reveal bands and densitometric analysis was used for quantification.

Quantitative RT-PCR

Total RNA extraction of mouse glomeruli and lung tissue was performed using Qiazol (Qiagen), according to manufacturer's recommendations. RNA reverse transcription was performed using the Quantitect Reverse Transcription kit (Qiagen) according to the manufacturer's protocol. The Maxima SYBR Green/Rox qPCR mix (Fermentas; Thermo Fisher Scientific) was used to amplify cDNA for 40 cycles on an ABI PRISM thermo cycler. The comparative method of relative quantification (2-DDCT) was used to calculate the expression level of each target gene, normalized to Ppia. The data are presented as the fold change in gene expression.

Statistical Analysis

Data are expressed as means±s.e.m. Statistical analyses were calculated by using GraphPad Prism software (GraphPad Software, La Jolla, Calif.). Comparisons between two groups were performed using t-tests (95% confidence interval) with Welch correction whenever the variances were different between groups. Comparisons between multiple groups were performed using one-way ANOVA or 2-ways ANOVA followed by Tukey post-test. Spearman rank coefficients were used in order to assess associations between two continuous variables. A P value <0.05 was considered significant.

Results

CD9 De Novo Expression During CGN

In order to identify novel markers of cells participating to destructive processes in extracapillary glomerular diseases, we carried out comparative analyses of RNA sequencing data from freshly isolated glomeruli from mice with a time course after nephrotoxic serum (NTS)-induced CGN at day 4 and day 10 (FIG. 1A). This approach revealed a striking increase in Cd9 transcript abundance in glomeruli as proliferative extracapillary diseases progressed (FIG. 1B). Of note, the relative increase in Cd9 mRNA expression occurred earlier than the one of Cd44, a known marker of PEC activation[2, 16, 17, 18, 19] with an earlier significant rise, suggesting a role for CD9 in disease initiation.

Immunostaining revealed early de novo expression of CD9 in PECs and in cells invading the glomerular capillary and devoid of podocyte markers (data not shown). This was further confirmed with observation that the majority of the CD9 expressing cells displayed CD44 and PDPN/podoplanin, whereas SNP/synaptopodin+ cells expressed little or no CD9 (data not shown). Comparative immunohistochemical analysis indicated that the prevalence of CD9+ cells consistently reflects different degrees of podocyte injury (data not shown).

Immunohistochemistry analyses also supported the relevance of this finding to human crescentic glomerulonephritis. CD9 staining did not reveal glomerular expression in kidney biopsies from healthy controls or patients with proteinuric non-proliferative glomerulonephritis such as Minimal Change Disease (MCD). Previously reported[20, 21, 22, 23, 24] constitutive expression was observed in distal convoluted tubuli, collecting tubuli, and faintly in mesangial cells and vascular smooth muscle cells (data not shown). In contrast, intense glomerular CD9 expression was observed in kidney biopsies from patients diagnosed with human proliferative glomerulonephritis such as ANCA-associated nephropathy or lupus nephritis with CGN where it was located in PECs as well as in cells engaged in destructive crescent formation (data not shown).

Cd9−/− Mice are Protected from CGN and Extracapillary Injury

Given the strong association between de novo glomerular CD9 expression and CGN, we next investigated the role of CD9 during glomerulonephritis in the murine NTS-induced CGN model. CD9 deficient (Cd9-)[25] mice showed no renal phenotype at baseline. Whereas NTS-challenged $Cd9^{+/+}$ mice displayed progressive deterioration of renal function, associating increased urine albumin-to-creatinine ratio (ACR) with glomerular crescentic lesions, CD9 deficiency protected mice from glomerular injury, as shown by a significantly 10-times lower ACR (440.6±228.8 mg·mmol$^{-1}$ in $Cd9^{-/-}$ mice vs. 5204±915.6 mg·mmol$^{-1}$ in $Cd9^{+/+}$ mice after 21 days) and 5-fold reduction of glomerular lesions (4.6±3% vs. 23.9±6.2% of crescents in $Cd9^{-/-}$ vs. $Cd9^{+/+}$ mice) (FIGS. 2A and 2B). Strikingly, no $Cd9^{-/-}$ but 7/10 $Cd9^{+/+}$ mice died from anuric end-stage kidney failure with 30-100% of crescentic glomeruli. CD9 deficiency conferred early protection with decreased ACR from day 5 onwards.

Platelet and Hematopoietic Cell CD9 is Dispensable for CGN

The CD9 antigen is strongly expressed on platelets[26] and platelets are activated in CGN, raising the hypothesis of a role for platelet-borne CD9 in vasculitis-inducing CGN. Therefore, we generated mice with a specific deletion of Cd9 in platelets (PF4-Cd9$^{lox/lox}$ mice) by crossing Cd9 floxed mice (data not shown) with mice expressing CRE selectively in platelets[27]. PF4-Cd9$^{lox/lox}$ mice were indiscernible from their control littermates (PF4-Cd9$^{wt/wt}$ mice) in terms of growth, platelet count and renal function until the age of 6 months (data not shown). When challenged with the NTN model, platelet-specific CD9 deficient mice displayed similar renal injury to control mice, as measured by ACR, BUN, and crescentic glomerular lesions (data not shown).

CD9 was also described originally as a 24-kDa surface protein of non-T acute lymphoblastic leukemia cells and developing B-lymphocytes[28], and in naive T cells[29]. We thus sought to evaluate the potential role of non-glomerular CD9 in CGN. Lethally irradiated $Cd9^{+/+}$ and $Cd9^{-/-}$ mice were reconstituted with bone marrow (BM) from either $Cd9^{+/+}$ or $Cd9^{-/-}$ congenic mice. Experimental CGN was induced in the chimeric mice. Interestingly, only mice with $Cd9^{-/-}$ kidneys were significantly protected from severe glomerular dysfunction and crescentic demolition, whereas mice with CD9-competent kidneys were not protected from the development of glomerular lesions with no influence of the genotype of their BM cells. Notably, crescentic glomerular lesions were more abundant in $Cd9^{+/+}$ mice than chimeric $Cd9^{-/-}$ mice with a CD9-competent BM (23.6±3.3% vs. 8.5±1.9% of crescents) (data not shown).

These results support the notion that it is the glomerular expression of CD9 that participates in CGN development and that crescentic glomerular lesions are not a consequence of CD9 expression in the hematopoietic compartment.

De Novo Expression of CD9 in PEC Promotes Glomerular Lesions

As CD9 de novo expression in glomeruli was observed in podocytes and PEC in human CGN and, given the recognized role of podocytes in the progression of crescentic lesions in CGN[2, 30, 31, 32] we then deleted Cd9 selectively in podocytes (Pod-Cd9$^{lox/lox}$ mice) by crossing Cd9 floxed mice with mice expressing CRE under the NPHS2 promoter (Pod-Cre mice)[33]. Pod-Cd9$^{lox/lox}$ mice had normal renal function at baseline and were indiscernible from their control littermates (Pod-Cd9$^{wt/wt}$ mice) (data not shown). In the nephrotoxic nephritis (NTN) model, Pod-Cd9$^{lox/lox}$ mice had similar renal injury as control mice, as shown by ACR (807.7±184.2 mg·mmol$^{-1}$ vs. 864.2±242.3 mg·mmol$^{-1}$ in Pod-Cd9$^{wt/wt}$ vs. Pod-Cd9$^{lox/lox}$ mice), BUN (51.96±9.46 mg·dL$^{-1}$ vs. 49.37±5.01 mg·dL$^{-1}$ in Pod-Cd9$^{wt/wt}$ vs. Pod-Cd9$^{lox/lox}$ mice) and crescentic glomerular lesions (27.67±2.36% vs. 30.00±2.63% of crescents in Pod-Cd9$^{wt/wt}$ vs. Pod-Cd9$^{lox/lox}$ mice) (data not shown), thus supporting the idea that podocyte CD9 expression is not involved in crescent formation in CGN.

We then generated mice with a specific Cd9 deletion in PEC (iPec-Cd9$^{lox/lox}$ mice) by crossing the Cd9 floxed mice with an inducible PEC-expressing CRE[34]. iPec-Cd9$^{lox/lox}$ mice had normal renal function (BUN=23.9±1.3 mg·dL$^{-1}$ vs. 20.7±1.7 mg·dL$^{-1}$ in iPec-Cd9$^{wt/wt}$) and no histological abnormalities neither at a microscopic nor at an ultrastructural level. Furthermore, glomerular CD9 expression was not detected at baseline (data not shown).

During the time-course of the NTN model, iPec-Cd9$^{wt/wt}$ control mice showed a rapid increase in ACR that finally led to impaired renal function associated with severe glomerular crescentic lesions (61.2±11.4% vs. 16.9±4.7% of crescents in iPec-Cd9$^{lox/lox}$) (data not shown). Conversely, iPec-Cd9$^{lox/lox}$ mice displayed renal protection as shown by significantly lower ACR starting from day 7 of experimentation, reduced BUN and preserved renal architecture (data not shown). Furthermore, we found CD9 expression in crescents and along the Bowman's capsule in control NTN mice, while efficient deletion of Cd9 was validated in iPec-Cd9$^{lox/lox}$ mice by no CD9 expression in PEC (data not shown). Furthermore, while typical podocyte-PEC synechiae participating in crescent formation were observed in iPec-Cd9$^{wt/wt}$ NTN mice, glomerular ultrastructure was preserved in iPec-Cd9$^{lox/lox}$ NTN mice (data not shown). Interestingly, CD9-expressing cells were activated PECs as shown by coexpression of CD9 with the hyaluronan receptor CD44[2], whereas no activated PECs were observed in iPec-Cd9$^{lox/lox}$ NTN mice (data not shown). Thus, CD9 appears to be implicated in PECs activation. Altogether, these results indicate that de novo expression of CD9 in PECs participates in the development of crescents in experimental CGN.

CD9 De Novo Expression in PEC During Human FSGS

Given the co-expression of CD9 with the activated-PEC marker CD44 during proliferative glomerulonephritis, we next investigated whether CD9 was involved in other diseases with PEC phenotypic changes, like FSGS[35, 36]. Interestingly, CD9 was also de novo expressed in glomeruli during human FSGS, including with the collapsing variant, where strong staining was found at synechiae and along the Bowman's capsule (Data not shown). These observations suggest that CD9 could be involved not only in CGN progression but also in other non-proliferative glomerulopathies.

CD9 Deficiency in PEC Reduces the Development of FSGS

Figure 3A:
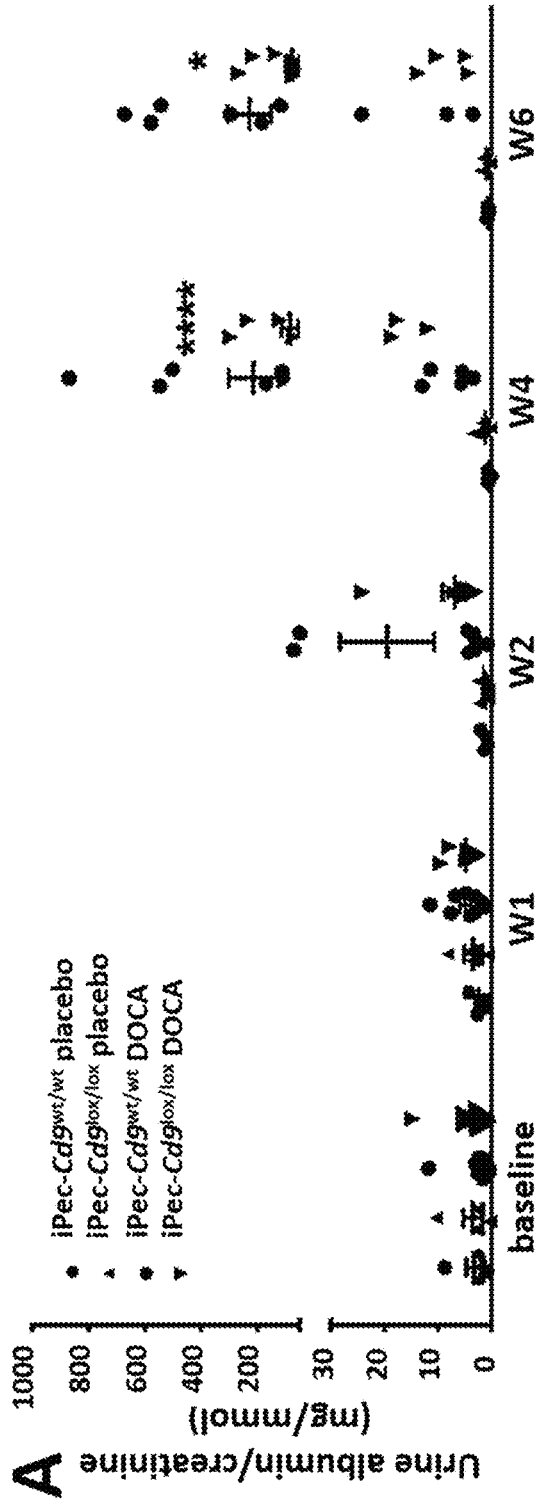
Figure 3B:
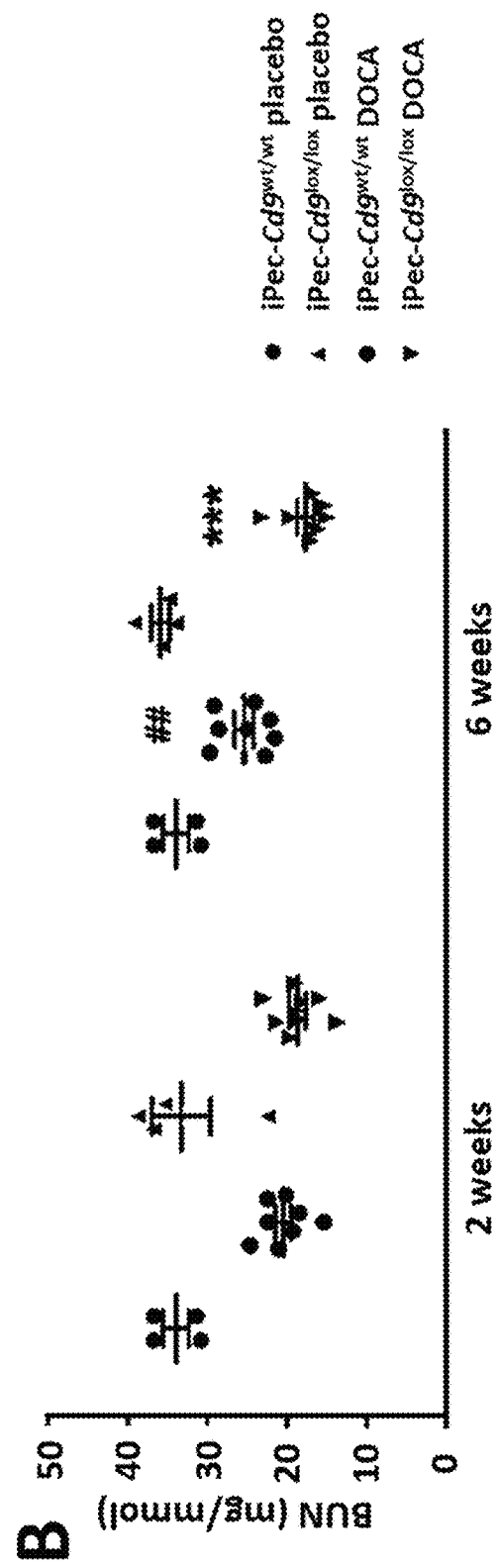
Figures 3C, 3D, 3E:
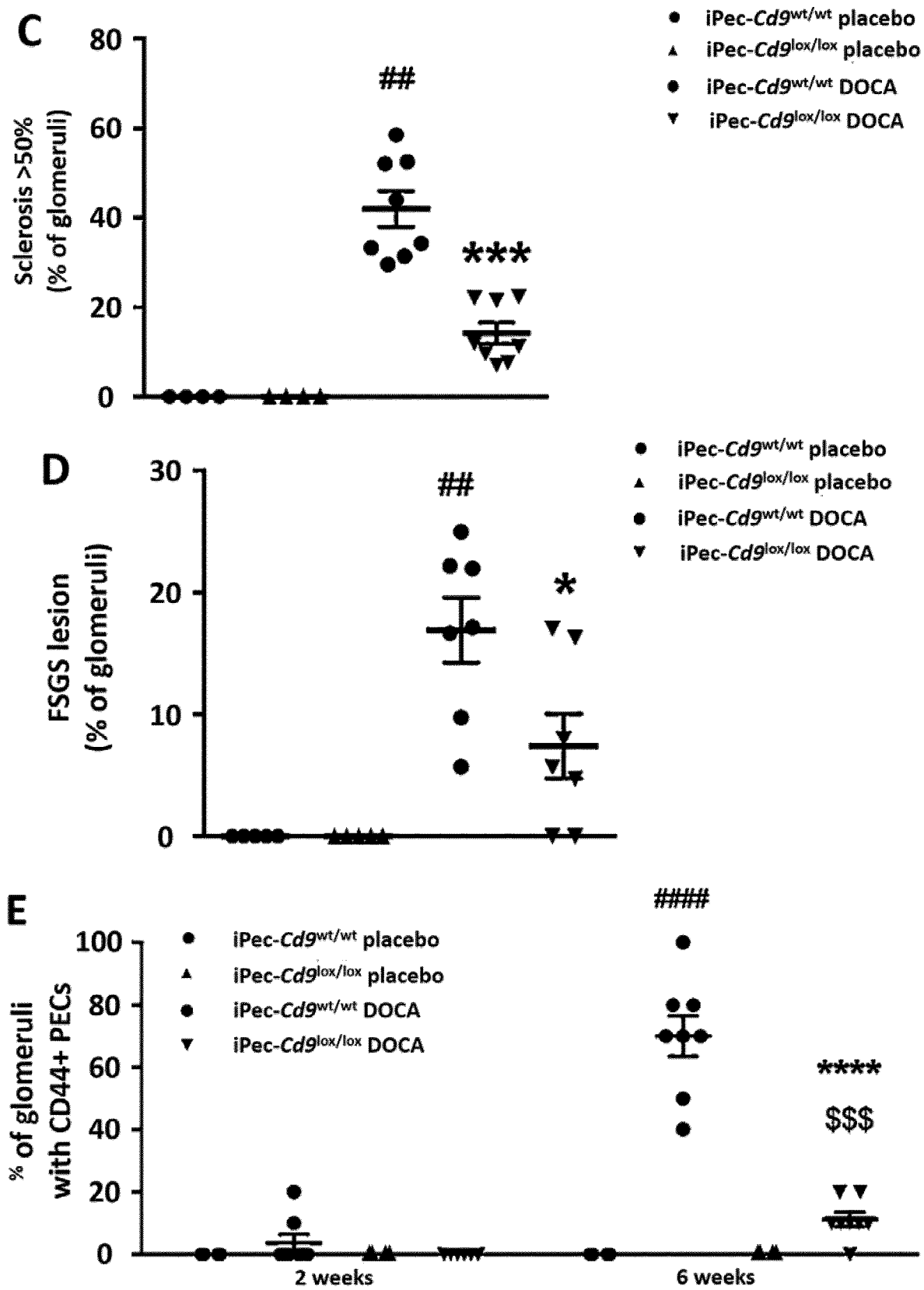
Figure 3F:
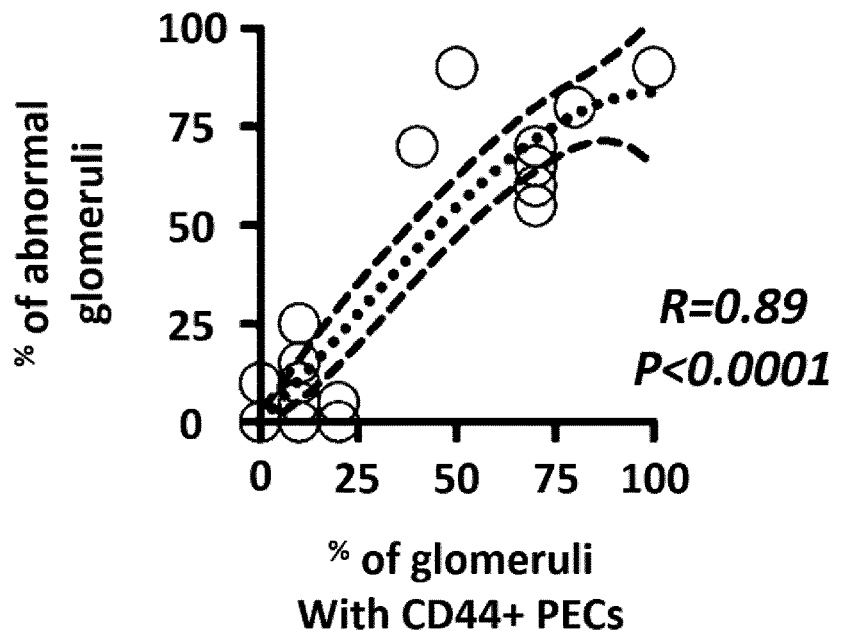
Figure 3G:
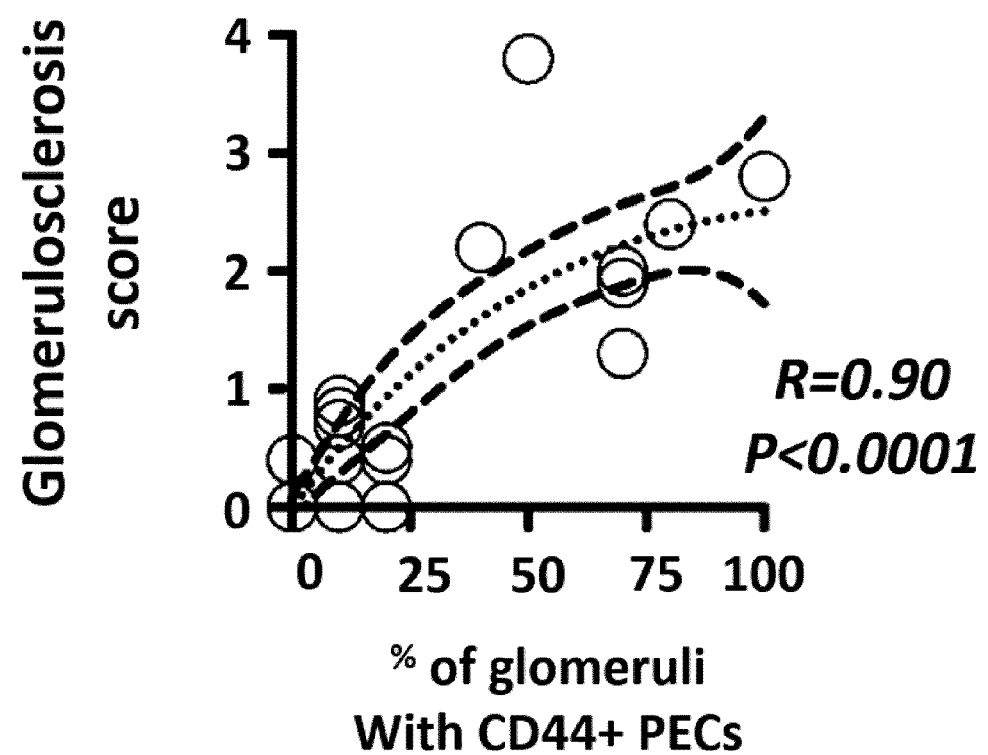

We then challenged PEC-specific CD9 deficient mice with a model of FSGS that combines high salt diet and deoxycorticosterone acetate (DOCA) with unilateral nephrectomy. Uninephrectomized mice implanted with placebo pellets were used as controls. In placebo-treated wild type mice and in iPec-Cd9$^{lox/lox}$ DOCA mice, CD9 was not detected in glomeruli, thus confirming that CD9 is not expressed in PEC at baseline (even after uninephrectomy) and that efficient deletion in iPec-Cd9$^{lox/lox}$ mice was obtained (data not shown). Conversely, in iPec-Cd9$^{wt/wt}$ DOCA mice, strong de novo glomerular expression of CD9 was observed and co-staining with CD44 demonstrated that CD9 expressing cells were activated PEC (data not shown). Vehicle-treated mice did not display renal dysfunction or histological abnormalities (data not shown). This supports the hypothesis that de novo CD9 expression is concomitant with PEC activation during FSGS. While iPec-Cd9$^{wt/wt}$ DOCA-salt treated mice showed a progressive increase in ACR (164.8±71.1 mg·mmol$^{-1}$ at W5 of the experiment) and BUN (25.3±1.2 mg·dL$^{-1}$) associated with glomerular sclerosis and FSGS lesions in iPec-Cd9$^{wt/wt}$ mice (percentage of glomeruli with >50% sclerosis, 42±4% and percentage of FSGS lesions, 16.9±2.6% after 6 weeks of experiment), PEC-specific CD9 deficiency was associated with a significant reduction in these parameters (ACR 86.6±27.3 mg·mmol$^{-1}$ at W5 of the experiment, BUN 17.6±1.1 mg·dL$^{-1}$, percentage of glomeruli with >50% sclerosis 14.3±2.3% and percentage of FSGS lesions 7.4±2.6% in iPec-Cd9$^{lox/lox}$ DOCA mice at W6) (FIGS. 3A-3D). Not only were CD44-positive PEC observed in higher numbers in iPec-Cd9$^{wt/wt}$ DOCA mice, but the number of CD44+ PEC also strongly correlated with the number of abnormal glomeruli (R=0.89) and glomerulosclerosis (R=0.90) (FIGS. 3E-3G). CD44+ PEC surrounding the Bowman's capsule were identified in FSGS lesions by immunofluorescence (data not shown). Podocyte loss was greater in iPec-Cd9$^{wt/wt}$ DOCA mice as shown by P57 and WT1 staining and correlated with PEC activation. Podocyte volume was increased in DOCA mice with no influence of genotype supporting the idea that the capacity of podocytes to respond to hypertrophic stress was maintained in the absence of CD9 (data not shown). Glomerular ultrastructure was preserved in iPec-Cd9$^{lox/lox}$ DOCA mice, whereas iPec-Cd9$^{wt/wt}$ DOCA mice exhibited large fibrous depositions in the glomerular basement membrane and flocculo-capsular synechiae (data not shown). Importantly, the differences observed between iPec-Cd9$^{lox/lox}$ and iPec-Cd9$^{wt/wt}$ mice were not related to blood pressure differences, as both genotypes demonstrated similar blood pressure increase in the time-course of the DOCA-salt model (systolic blood pressure 150.6±4.8 vs. 154.9±4.6 mmHg in iPec-Cd9$^{wt/wt}$ vs. iPec-Cd9$^{lox/lox}$ DOCA mice) (data not shown). Hemodynamic changes cannot explain the differences in podocyte loss between iPec-Cd9$^{wt/wt}$ and iPec-Cd9$^{lox/lox}$ DOCA mice either, as glomerular volume remained unchanged between DOCA groups (8.6±0.7×10$^5$ vs. 8.1±0.7×10$^5$ μm$^3$ in iPec-Cd9$^{wt/wt}$ vs. iPec-Cd9$^{lox/lox}$ DOCA mice; data not shown). Interestingly, interstitial fibrosis was significantly reduced in iPec-Cd9$^{lox/lox}$ DOCA mice supporting the idea that Cd9 specific deletion in PEC not only influences glomerular damage but also tubulo-interstitial fibrosis and thus global kidney fate (data not shown). Collectively, these results support the notion that CD9 is critically involved in the development of glomerular lesions in experimental FSGS.

We thus demonstrate that CD9 correlates with PEC activation in both experimental CGN and FSGS and is required for such phenotypic switch.

We next focused on the underlying mechanisms of Cd9-related PEC activation using an in vitro approach.

CD9 Knockdown Prevents PEC Proliferation and Migration

Short hairpin RNA interference yielded a 85% reduction in CD9 expression in a PEC cell line[37] (data not shown). CD9-depleted PECs displayed a strong delay in adhesion to plastic (data not shown) that was associated with reduced cell spreading (3012±135.7 vs. 1649±70.7 μm$^2$ for scramble and Cd9 shRNA PEC, respectively; data not shown). This change of phenotype was not a consequence of increased apoptosis, as measured by caspase 3-cleavage and propidium iodide/annexin 5 flow cytometry (data not shown).

PDGF-BB stimulation induced PEC proliferation as measured by an increased number of KI67+ cells. Cd9 knockdown reduced the number of KI67+ cells (data not shown), suggesting that CD9 controls PDGF-BB-mediated PEC proliferation. Next, we quantified in vivo PEC proliferation (PCNA+ PECs) using both NTN and DOCA-salt models in iPec-Cd9$^{wt/wt}$ mice. As expected extracapillary cell proliferation was measured in diseased iPec-Cd9$^{wt/wt}$ animals, while PEC proliferation was abolished in iPec-Cd9$^{lox/lox}$ mice (data not shown). Together, these findings suggest that CD9 de novo expression may be an important mediator of PECs proliferation in FSGS and CGN.

Importantly, HB-EGF and PDGF-BB both induced PEC migration in scratch assays. Cd9 knockdown reduced migration in response to both growth factors (data not shown).

PEC Sensing of Local Chemoattractants Involves CD9

As observed in CGN and FSGS, PECs attach to and migrate toward the glomerular tuft. This led us to hypothesize that they may be sensitive to chemoattractants filtered through the capillary and/or locally produced by it.

Therefore, we modeled a growth factor steep gradient in microfluidic channels to evaluate the capability of PECs to sense local changes in chemoattractants that may surround them in the urinary chamber.

We used microfluidic microchannels to assess the oriented migration of PECs in a PDGF-BB gradient (data not shown). The T-shape of the microfluidic microchannel allowed us to apply PDGF-BB-containing medium at one entrance and standard medium at the other, thus creating a PDGF-BB concentration gradient in the principal branch of the channel. The shape and the values of the gradient could be calculated at every position (data not shown). The absolute value of the average cell displacement was similar between scramble and Cd9 shRNA PECs (data not shown) suggesting that the ability to migrate was preserved despite defects in adhesion and spreading observed under static conditions. PECs showed limited motion with the direction flow, and instead chose to migrate orthogonally to the flow attracted by the PDGF-BB gradient. No migration or enhancement of motility were observed in regions of the microchannels where the average PDGF concentration is significantly higher (data not shown) suggesting that the effect of CD9 knockdown cannot be compensated by significant PDGFR overstimulation. Strikingly, CD9 depletion abolished the ability of PECs to respond to the gradient (data not shown). Altogether, these experiments indicate that Cd9 knockdown in PECs impairs their gradient-sensing ability without affecting their motility.

CD9-Deficient PECs Display Reduced Expression of B1 Integrin

Given the role of ITGB1 in cell spreading and migration[38, 39, 40] and the fact that CD9 has been found to associate with the pre-01 subunit of ITGB1 in other cell types[41], we then analyzed ITGB1 expression in CD9-depleted PECs. Knocking down Cd9 in PECs resulted in an ~30% reduction in ITGB1 content in cell lysates (data not shown), while immunofluorescence confirmed loss of ITGB1 membrane expression in CD9-deficient PECs (data not shown). Not only Itgb1, but also Itgb3, Itga1, Itga3 and Itga10 mRNA expression were decreased in CD9-deficient PECs, thus suggesting involvement in altered cytoskeletal dynamics in these cells (data not shown). In situ, basal ITGB1 expression was low with a mesangial and endothelial endocapillary pattern (data not shown). ITGB1 expression was enhanced in iPEc-Cd9$^{wt/wt}$ diseased glomeruli in both experimental CGN and FSGS and localized to crescents and activated PECs. Interestingly, expansion of the ITGB1 expressing cells correlated with loss of podocyte marker NPHS2 (data not shown) and colocalized with PEC activation marker CD44 to a large extent but displayed a more widespread expression (data not shown).

In iPec-Cd9$^{lox/lox}$ NTN and iPec-Cd9$^{lox/lox}$ DOCA mice ITGB1 expression was low in PEC (data not shown). These results suggest that ITGB1 is a novel marker of PEC activation and might participate in glomerular extracapillary lesions formation.

Podocyte Loss is not Sufficient to Trigger CD9 Expression in PECs and FSGS.

It has been believed that podocyte injury may occur prior to the PEC activation. Therefore, we evaluated whether podocyte injury would induce CD9 expression in PECs. To this end, we assessed CD9 glomerular expression in a model characterized with accentuated podocyte loss and glomerulosclerosis upon genetic targeting of podocyte autophagy that exacerbates diabetic nephropathy. In that model, we demonstrated increased proteinuria and podocyte injury with foot process effacement and loss of differentiation markers in Nphs2.cre Atg5$^{lox/lox}$ diabetic mice but never observed FSGS nor synechiae[42]. We re-analyzed these kidneys looking for the PEC activation marker CD44 and for CD9 expression. We found no CD44 and no CD9 expression in PECs, neither in diabetic WT nor in diabetic Nphs2.cre Atg5$^{lox/lox}$ mice (data not shown) despite the latter group showed marked podocyte loss. Thus, in this specific case, podocyte injury is not sufficient to induce neither PEC activation nor CD9 de novo expression.

Conversely, we recently observed experimental FSGS without primary podocyte insult but with manipulation of the endothelial HIF2/EPAS1 pathway using mouse genetics 43. Upon chronic angiotensin II infusion and high salt diet, Cdh5-CRE Epas1$^{lox/lox}$ mice developed similar degree of podocyte injury to their wild type counterparts. Surprisingly, FSGS lesions with CD44+ and Fibronectin+ PECs where observed only in Cdh5-CRE Epas1$^{lox/lox}$ hypertensive mice 43. We next analyzed CD9 expression and found de novo CD9 expression in PECs in the hypertensive Cdh5-CRE Epas1$^{lox/lox}$ mice only. De novo high CD9 expression was almost exclusively associated with FSGS lesions and CD44 expression. Altogether, this findings suggests that endothelial derived mediators may contribute to CD9 induction in PECs and FSGS.

PDGFR and EGFR Pathways are Impaired in Cd9-Deficient PEC

PDGF-BB-mediated cell migration involves signal transduction through PDGFRβ phosphorylation, notably at Tyr 100944, and subsequent FAK activation. Interestingly, Cd9-depleted PECs showed decreased abundance of PDGFRβ both at protein and mRNA level (data not shown). While PDGF-BB induced a rapid and transient PDGFRβ phosphorylation, Cd9-depleted PECs showed impaired PDGFRβ phosphorylation (data not shown). As a consequence, activation of FAK was also impaired, as shown by reduced phosphorylation at Tyr 397 (data not shown). In a similar manner, we observed that the HB-EGF/EGFR/FAK pathway was also defective in CD9-depleted cells with a decreased level of total EGFR and its Tyr 1068 phosphorylation after HB-EGF stimulation. Consistently, FAK phosphorylation was reduced as well (data not shown). These results suggest that the impaired migratory capacity observed in Cd9-depleted PECs is a consequence of defective PDGFRβ and EGFR signaling. Indeed, the lack of gradient-sensing ability (chemotaxis) of CD9-depleted PECs cannot be explained by the observed decrease in ITGB1 levels only, as cell motility is preserved.

CD9 Expression in Humans Correlates with CD44 and ITGB1

As we observed that CD9 expression in PEC correlated with PEC activation in experimental CGN and FSGS, and that CD9 depletion was associated with decreased ITGB1 levels, we analyzed CD9 expression in combination with CD44 and ITGB1 in human glomerulopathies. We found that CD9 closely colocalized with ITGB1 during human extracapillary glomerulopathies such as ANCA-associated CGN and FSGS but not in non-proliferative glomerulonephritides or in normal kidney (data not shown). Notably, CD9 and ITGB1 are predominantly expressed by PECs along the Bowman's capsule in FSGS lesions and in crescents. CD9-CD44 co-staining further confirmed that activated PECs account for a large number of CD9-expressing cells. These data support the hypothesis that de novo CD9 expression in CGN and FSGS contributes to the formation of glomerular lesions (i.e. crescent formation or synechiae) through PEC migration/activation, involving HB-EGF-EGFR and PDGFR pathway activation, and increased ITGB1 levels.

Discussion:

Here, we report that pathogenic expression of CD9 by glomerular parietal epithelial cells drives glomerular damage during CGN and FSGS. This tetraspanin has emerged as a threshold determinant from our search of systematic clusters of epithelial cell surface components capable of transducing migratory and proliferative signals in epithelial cells.

Although PECs have been implicated in the generation of fibrotic lesions in FSGS[45] and in the formation of the crescent in CGN[34], we provide evidences that PEC protein is directly implicated in their activation and pathogenic transformation of glomerular structure and function. Using genetic tracing of glomerular epithelial cells, Smeets et al. previously showed that PEC accounts for the largest number of cells in the formation of the crescent during CGN and FSGS in mice[2]. Here, we show that CD9 is de novo expressed in PECs among renal pathologies involving PEC activation (i.e migration and proliferation). Interestingly, CD9 expression in PECs was found in FSGS-like (DOCA-salt and Angiotensin II-induced hypertension in a sensitive genetic model[43]) and CGN-like rodent models, always in association with CD44 expression. Conversely, no CD9 expression was found in PECs in mouse model of diabetic nephropathy, even in a model prone to podocyte injury (i.e Nphs2.cre Atg5$^{lox/lox}$). Thus, CD9 seems to be a novel and selective driver of PEC activation.

Furthermore, we demonstrate that a specific ablation of CD9 expression in PECs confers protection not only in the inflammatory model of CGN but also in a model of FSGS, a more chronic form of glomerular injury.

Podocyte injury is critical for destruction of the filtration barrier in glomerulonephritis. Silencing Cd9 not only reduced PEC-induced glomerulosclerosis but also maintained the number of podocytes. While CD9 is expressed by both podocytes and PECs in human pathologies, CD9 de novo expression in podocytes in NTN and DOCA-salt models was low, probably explaining why Cd9 deletion in podocytes had no impact on outcomes.

This supports the notion that podocyte displacement by invading PECs contributes to the destruction of the glomerular filtration barrier in FSGS. Triggers for CD9 overexpression are unknown. CD9 was found to be upregulated by mechanical stress in cultured immortalized podocytes whereas most of the tetraspanins remained unaffected[46]. Thus, further work would be useful to ascertain the influence of mechanical stimuli in CD9 regulation in PECs.

Changes in the PEC phenotype, i.e. the proliferation and migration of a normally quiescent cell population, represent key steps in the destruction of glomeruli during CGN and FSGS[1, 34, 45]. It has been previously shown that CD9 can either promote or suppress cancer cell migration and metastasis depending on the type of cancer, the type of cells involved, and the migratory signal[47, 48]. Meanwhile the case of many types of cancer cells where CD9 promotes cell proliferation and migration[49, 50, 51] may share similarities with the mechanisms whereby CD9 drives renal disease via aberrant expression in PECs. Targeting CD9 with specific antibodies can reduce the migration of malignant cancer cells[52]. Concordantly Cd9 silencing in immortalized PECs impaired their ability to proliferate and migrate in a directional manner. These findings should help decipher the origins of glomerular injury. Interestingly, CD9 induces a complete remodeling of PECs and seems to drive an EMT-like phenotype as shown by changes in Cldn1, Vimentin or Snail in CD9-deficient PECs.

How does CD9 expression help drive PEC out of quiescence? HB-EGF activation of EGFR is a key driver of renal damage in early stages of mouse and human glomerulonephritis[11] and CD9 is known to form molecular microdomains at the cell surface in which EGFR is associated[9] and modulate its activation by yet unknown mechanisms. After paracrine activation of the EGFR pathway by TGFα, CD9 potentiates EGFR signaling[53] although we previously ruled out the involvement of TGFα in CGN[11]. Interestingly, CD9 was shown to be a "diphtheria toxin receptor-associated protein" (DRAP27), forming a complex with proHB-EGF at the cell membrane, and upregulating its juxtacrine mitogenic activity[54]. Although this could likely play a pathogenic role, we suspect that other complex mechanisms are at play to explain the powerful effect of CD9 deficiency in vivo and in vitro in the presence of soluble chemoattractants such as mature HB-EGF and PDGFBB.

The PDGFR pathway also contributes to renal damage during CGN. Upregulation or de novo expression of PDGF-BB has been described in mesangial cells, podocyte vascular cells, tubular and interstitial cells in animal models and human renal diseases in many studies[55]. The PDGFR has also been reported to associate with CD9[10], and PDGFRβ levels and activation were indeed reduced upon CD9 depletion. Potentiation of EGFR and PDGFR pathways would be predicted to enable chemotaxis by increasing engagement of downstream effectors such as FAK. Various RTKs are recruited to and enriched within specific plasma membrane microdomains[56], and CD9 tetraspanin-enriched microdomains may control actin-dependent protrusive membrane microdomains such as dorsal ruffles and invadosomes. CD9 may thus promote growth factor signaling through the formation and stabilization of tetraspanin-enriched signaling microdomains[57] that promote EGFR and PDGFRβ receptor insertion in the plasma cell membrane. Its facilitating role upstream of both HBEGF-EGFR and PDGFR pathways could position CD9 as an attractive therapeutic target for both CGN and FSGS.

Another relevant mechanism of action of CD9 could be through modulation of integrin signaling. In cells that have an abundant pool of intracellular integrins, CD9 (but not CD81 or CD82) is associated with the pre-β1 subunit and calnexin, an ER chaperone protein[41]. Whether or not these early associations with tetraspanins are required for proper biogenesis or turnover of the integrin remains to be determined. This is suggested by the decrease in ITGB1 protein abundance in Cd9-deleted PEC that could in turn contribute to their lack of adhesion and motility. The report of a CD9 conformation-dependent epitope whose expression depends on changes in the activation state of associated α6β1 integrin suggests another potential level of functionally relevant CD9 involvement in $\beta_1$ integrin-dependent cellular processes[58].

Reduced ITGB1 expression could also participate in the decrease of PEC proliferation as integrin-mediated extracellular-matrix attachment is crucial to ensure glomerular epithelial cells response to growth factors[59]. Increased expression of both ß1 and ß3 integrins have been reported in human CGN[60,61]. In rodent models, ß1 integrin is overexpressed 7 days after CGN induction, promoting cell adhesion to the matrix proteins[62]. Recently, Prakoura et al. described the colocalization of NF-κB-induced periostin with ß3 integrin in activated crescentic PEC in the NTN model[61]. As a major laminin and collagen receptor, integrin β1 promotes glomerulosclerosis during FSGS by driving collagen production[63]. Integrin-linked kinase, which interacts with β1 integrins, is overexpressed by PGP.5-positive cells (PGP.5 being a PEC marker) in the crescent during rat CGN[64].

CD44 has been found recently to participate in PECs proliferation in experimental CGN and FSGS[18]. Thus, CD9 is a major regulator of PEC activation also through control of CD44 expression as CD9-deficient PECs presented decreased Cd44 mRNA expression (data not shown) and more spectacularly, no induction of CD44 high expression upon NTS or DOCA-salt UNx challenge (data not shown).

Key observations in rodent models could be reproduced in human glomerulopathies, suggesting a role for CD9 also in human disease. Indeed, during human CGN and FSGS, we showed that activated PEC expressed CD9 that colocalized closely with ITGB1 and CD44, especially in crescents and synechiae across the urinary chamber. Interestingly, occurrence of combined expression of CD9 with ITGB1 was more consistent than combined expression of CD9 with CD44 suggesting the existence of various stages of PEC activation or distinct subsets of such cells. Altogether, our results support the implication of CD9 in PEC activation and ITGB1-mediated glomerular lesions in both diseases. Although we demonstrate that a clear interaction exists between CD9, ITGB1 and EGFR/PDGFR, the precise way by which these proteins interact to regulate adhesion and chemotaxis is complex, possibly multifactorial and requires further investigations.

At last, we observed that PDGF-BB and HB-EGF that are produced by the glomerular tuft in CGN, and to a lesser although significant extent in FSGS, display chemotactic and mitogenic influences on PECs. Modeling urinary gradients of PDGF-BB or HB-EGF in microfluidic channels demonstrated the capability of PECs to sense local changes in chemoattractants in the urinary chamber and revealed a critical facilitating role for CD9 in this process. Extension of such proof of concept experiments should help identifying other key molecules emanating from the injured capillary and triggering PEC-mediated maladaptive response to injury.

In conclusion, we demonstrate that preventing local expression of CD9 by PEC in glomeruli alleviates glomerular damages in two distinct severe diseases, CGN and FSGS (data not shown). Targeting CD9 pathway could offer therapeutic options and warrants further attention. CD9 expression in PECs could also provide a marker for diagnosis of CGN and FSGS. Indeed, CD9-positive PECs involved in crescent and sclerotic lesions were not always CD44 positive, implying that markers of PEC activation may vary as a function of time or reflect heterogeneous PEC subsets. Thus, CD9 staining may be considered for early diagnosis and management of these diseases.

Finally, our study suggests a concept in which severe kidney diseases characterized by pathogenic PEC recruitment to the glomerular tuft may all depend on a CD9-dependent molecular complex that adjusts the threshold for proliferation and directional migration of these cells.

REFERENCES

Throughout this application, various references describe the state of the art to which this invention pertains. The disclosures of these references are hereby incorporated by reference into the present disclosure.

1. Shankland S J, Smeets B, Pippin J W, Moeller M J. The emergence of the glomerular parietal epithelial cell. Nat Rev Nephrol 10, 158-173 (2014).
2. Smeets B, et al. Tracing the origin of glomerular extracapillary lesions from parietal epithelial cells. J Am Soc Nephrol 20, 2604-2615 (2009).
3. Guettier C, Nochy D, Jacquot C, Mandet C, Camilleri J P, Bariety J.
Immunohistochemical demonstration of parietal epithelial cells and macrophages in human proliferative extracapillary lesions. Virchows Arch A Pathol Anat Histopathol 409, 739-748 (1986).
4. Hemler M E. Tetraspanin proteins promote multiple cancer stages. Nat Rev Cancer 14, 49-60 (2014).
5. Charrin S, Jouannet S, Boucheix C, Rubinstein E. Tetraspanins at a glance.
Journal of cell science 127, 3641-3648 (2014).
6. Jones P H, Bishop L A, Watt F M. Functional significance of CD9 association with beta 1 integrins in human epidermal keratinocytes. Cell Adhes Commun 4, 297-305 (1996).
7. Ziyyat A, et al. CD9 controls the formation of clusters that contain tetraspanins and the integrin alpha 6 beta 1, which are involved in human and mouse gamete fusion. Journal of cell science 119, 416-424 (2006).
8. Nakamura K, Iwamoto R, Mekada E. Membrane-anchored heparin-binding EGF-like growth factor (HB-EGF) and diphtheria toxin receptor-associated protein (DRAP27)/CD9 form a complex with integrin alpha 3 beta 1 at cell-cell contact sites. J Cell Biol 129, 1691-1705 (1995).
9. Murayama Y, et al. The tetraspanin CD9 modulates epidermal growth factor receptor signaling in cancer cells. J Cell Physiol 216, 135-143 (2008).
10. Jeibmann A, et al. Involvement of CD9 and PDGFR in migration is evolutionarily conserved from *Drosophila* glia to human glioma. J Neurooncol 124, 373-383 (2015).
11. Bollee G, et al. Epidermal growth factor receptor promotes glomerular injury and renal failure in rapidly progressive crescentic glomerulonephritis. Nature medicine 17, 1242-1250 (2011).
12. Floege J, Eitner F, Alpers C E. A new look at platelet-derived growth factor in renal disease. J Am Soc Nephrol 19, 12-23 (2008).
13. Iyoda M, et al. Long- and short-term treatment with imatinib attenuates the development of chronic kidney disease in experimental anti-glomerular basement membrane nephritis. Nephrol Dial Transplant 28, 576-584 (2013).
14. Ostendorf T, Boor P, van Roeyen C R, Floege J. Platelet-derived growth factors (PDGFs) in glomerular and tubulointerstitial fibrosis. Kidney Int Suppl (2011) 4, 65-69 (2014).
15. van Roeyen C R, Ostendorf T, Floege J. The platelet-derived growth factor system in renal disease: an emerging role of endogenous inhibitors. European journal of cell biology 91, 542-551 (2012).
16. Smeets B, et al. Detection of activated parietal epithelial cells on the glomerular tuft distinguishes early focal segmental glomerulosclerosis from minimal change disease. The American journal of pathology 184, 3239-3248 (2014).
17. Kuppe C, et al. Common histological patterns in glomerular epithelial cells in secondary focal segmental glomerulosclerosis. Kidney Int 88, 990-998 (2015).

18. Eymael J, et al. CD44 is required for the pathogenesis of experimental crescentic glomerulonephritis and collapsing focal segmental glomerulosclerosis. Kidney Int 93, 626-642 (2018).
19. Roeder S S, et al. Changes in glomerular parietal epithelial cells in mouse kidneys with advanced age. Am J Physiol Renal Physiol 309, F164-178 (2015).
20. Perrot J Y, Boucheix C, Mirshahi M, Kazatchkine M, Bariety J. [Monoclonal antibodies against surface antigens of lymphoblasts and blood cells or bone marrow recognize constituents of the human nephron]. Nephrologie 5, 53-57 (1984).
21. Davis I D, LeBien T W, Lindman B J, Platt J L. Biochemical and histochemical characterization of a murine tubular antigen. J Am Soc Nephrol 1, 1153-1161 (1991).
22. Sincock P M, Mayrhofer G, Ashman L K. Localization of the transmembrane 4 superfamily (TM4SF) member PETA-3 (CD151) in normal human tissues: comparison with CD9, CD63, and alpha5beta1 integrin. J Histochem Cytochem 45, 515-525 (1997).
23. Kuroda N, et al. Expression of CD9/motility-related protein 1 (MRP-1) in renal parenchymal neoplasms: consistent expression in papillary and chromophobe renal cell carcinomas. Hum Pathol 32, 1071-1077 (2001).
24. Nakamura Y, Handa K, Iwamoto R, Tsukamoto T, Takahasi M, Mekada E. Immunohistochemical distribution of CD9, heparin binding epidermal growth factor-like growth factor, and integrin alpha3beta1 in normal human tissues. J Histochem Cytochem 49, 439-444 (2001).
25. Le Naour F, Rubinstein E, Jasmin C, Prenant M, Boucheix C. Severely reduced female fertility in CD9-deficient mice. Science 287, 319-321 (2000).
26. Boucheix C, et al. Molecular cloning of the CD9 antigen. A new family of cell surface proteins. The Journal of biological chemistry 266, 117-122 (1991).
27. Tiedt R, Schomber T, Hao-Shen H, Skoda R C. Pf4-Cre transgenic mice allow the generation of lineage-restricted gene knockouts for studying megakaryocyte and platelet function in vivo. Blood 109, 1503-1506 (2007).
28. Jones N H, Borowitz M J, Metzgar R S. Characterization and distribution of a 24,000-molecular weight antigen defined by a monoclonal antibody (DU-ALL-1) elicited to common acute lymphoblastic leukemia (cALL) cells. Leuk Res 6, 449-464 (1982).
29. Kobayashi H, et al. The tetraspanin CD9 is preferentially expressed on the human CD4(+)CD45RA+ naive T cell population and is involved in T cell activation. Clin Exp Immunol 137, 101-108 (2004).
30. Bariety J, Bruneval P, Meyrier A, Mandet C, Hill G, Jacquot C. Podocyte involvement in human immune crescentic glomerulonephritis. Kidney Int 68, 1109-1119 (2005).
31. Moeller M J, et al. Podocytes populate cellular crescents in a murine model of inflammatory glomerulonephritis. J Am Soc Nephrol 15, 61-67 (2004).
32. Thorner P S, Ho M, Eremina V, Sado Y, Quaggin S. Podocytes contribute to the formation of glomerular crescents. J Am Soc Nephrol 19, 495-502 (2008).
33. Moeller M J, Sanden S K, Soofi A, Wiggins R C, Holzman L B. Podocyte-specific expression of cre recombinase in transgenic mice. Genesis 35, 39-42 (2003).
34. Appel D, et al. Recruitment of podocytes from glomerular parietal epithelial cells. J Am Soc Nephrol 20, 333-343 (2009).
35. Smeets B, et al. Parietal epithelial cells participate in the formation of sclerotic lesions in focal segmental glomerulosclerosis. J Am Soc Nephrol 22, 1262-1274 (2011).
36. Smeets B, et al. The parietal epithelial cell: a key player in the pathogenesis of focal segmental glomerulosclerosis in Thy-1.1 transgenic mice. J Am Soc Nephrol 15, 928-939 (2004).
37. Kabgani N, et al. Primary cultures of glomerular parietal epithelial cells or podocytes with proven origin. PloS one 7, e34907 (2012).
38. Buck C A, Horwitz A F. Integrin, a transmembrane glycoprotein complex mediating cell-substratum adhesion. J Cell Sci Suppl 8, 231-250 (1987).
39. Margadant C, Monsuur H N, Norman J C, Sonnenberg A. Mechanisms of integrin activation and trafficking. Curr Opin Cell Biol 23, 607-614 (2011).
40. Shafaq-Zadah M, et al. Persistent cell migration and adhesion rely on retrograde transport of beta(1) integrin. Nat Cell Biol 18, 54-64 (2016).
41. Rubinstein E, Poindessous-Jazat V, Le Naour F, Billard M, Boucheix C. CD9, but not other tetraspans, associates with the beta1 integrin precursor. European journal of immunology 27, 1919-1927 (1997).
42. Lenoir 0, et al. Endothelial cell and podocyte autophagy synergistically protect from diabetes-induced glomerulosclerosis. Autophagy 11, 1130-1145 (2015).
43. Luque Y, et al. Endothelial Epas1 Deficiency Is Sufficient To Promote Parietal Epithelial Cell Activation and FSGS in Experimental Hypertension. J Am Soc Nephrol 28, 3563-3578 (2017).
44. Ronnstrand L, et al. SHP-2 binds to Tyr763 and Tyr1009 in the PDGF beta-receptor and mediates PDGF-induced activation of the Ras/MAP kinase pathway and chemotaxis. Oncogene 18, 3696-3702 (1999).
45. Dijkman H, Smeets B, van der Laak J, Steenbergen E, Wetzels J. The parietal epithelial cell is crucially involved in human idiopathic focal segmental glomerulosclerosis. Kidney Int 68, 1562-1572 (2005).
46. Blumenthal A, et al. Mechanical stress enhances CD9 expression in cultured podocytes. Am J Physiol Renal Physiol 308, F602-613 (2015).
47. Jiang X, Zhang J, Huang Y. Tetraspanins in cell migration. Cell Adh Migr 9, 406-415 (2015).
48. Vences-Catalan F, Levy S. Immune Targeting of Tetraspanins Involved in Cell Invasion and Metastasis. Frontiers in immunology 9, 1277 (2018).
49. Hori H, Yano S, Koufuji K, Takeda J, Shirouzu K. CD9 expression in gastric cancer and its significance. The Journal of surgical research 117, 208-215 (2004).
50. Huan J, et al. Overexpression of CD9 correlates with tumor stage and lymph node metastasis in esophageal squamous cell carcinoma. International journal of clinical and experimental pathology 8, 3054-3061 (2015).
51. Kischel P, et al. Overexpression of CD9 in human breast cancer cells promotes the development of bone metastases. Anticancer Res 32, 5211-5220 (2012).
52. Cajot J F, Sordat I, Silvestre T, Sordat B. Differential display cloning identifies motility-related protein (MRP/CD9) as highly expressed in primary compared to metastatic human colon carcinoma cells. Cancer research 57, 2593-2597 (1997).
53. Shi W, Fan H, Shum L, Derynck R. The tetraspanin CD9 associates with transmembrane TGF-alpha and regulates TGF-alpha-induced EGF receptor activation and cell proliferation. J Cell Biol 148, 591-602 (2000).
54. Iwamoto R, Higashiyama S, Mitamura T, Taniguchi N, Klagsbrun M, Mekada E. Heparin-binding EGF-like 55. Floege J, Johnson R J. Multiple roles for platelet-derived growth factor in renal disease. Miner Electrolyte Metab 21, 271-282 (1995).
56. Delos Santos R C, Garay C, Antonescu C N. Charming neighborhoods on the cell surface: plasma membrane microdomains regulate receptor tyrosine kinase signaling. Cell Signal 27, 1963-1976 (2015).
57. Hemler M E. Tetraspanin functions and associated microdomains. Nat Rev Mol Cell Biol 6, 801-811 (2005).
58. Gutierrez-Lopez M D, et al. A functionally relevant conformational epitope on the CD9 tetraspanin depends on the association with activated beta1 integrin. The Journal of biological chemistry 278, 208-218 (2003).
59. Cybulsky A V, Bonventre J V, Quigg R J, Wolfe L S, Salant D J. Extracellular matrix regulates proliferation and phospholipid turnover in glomerular epithelial cells. Am J Physiol 259, F326-337 (1990).
60. Baraldi A, et al. Beta 1 and beta 3 integrin upregulation in rapidly progressive glomerulonephritis. Nephrol Dial Transplant 10, 1155-1161 (1995).
61. Prakoura N, Kavvadas P, Kormann R, Dussaule J C, Chadjichristos C E, Chatziantoniou C. NFkappaB-Induced Periostin Activates Integrin-beta3 Signaling to Promote Renal Injury in GN. J Am Soc Nephrol 28, 1475-1490 (2017).
62. Kagami S, Border W A, Ruoslahti E, Noble N A. Coordinated expression of beta 1 integrins and transforming growth factor-beta-induced matrix proteins in glomerulonephritis. Lab Invest 69, 68-76 (1993).
63. Borza C M, et al. Inhibition of integrin alpha2beta1 ameliorates glomerular injury. J Am Soc Nephrol 23, 1027-1038 (2012).
64. Shimizu M, et al. Role of integrin-linked kinase in epithelial-mesenchymal transition in crescent formation of experimental glomerulonephritis. Nephrol Dial Transplant 21, 2380-2390 (2006).
65. Gu H, Zou Y R, Rajewsky K. Independent control of immunoglobulin switch recombination at individual switch regions evidenced through Cre-loxP-mediated gene targeting. Cell 73, 1155-1164 (1993).
66. Henique C, et al. Genetic and pharmacological inhibition of microRNA-92a maintains podocyte cell cycle quiescence and limits crescentic glomerulonephritis. Nature communications 8, 1829 (2017).
67. Weibel E R, Gomez D M. Architecture of the human lung. Use of quantitative methods establishes fundamental relations between size and number of lung structures. Science 137, 577-585 (1962).
68. White K E, Bilous R W. Estimation of podocyte number: a comparison of methods. Kidney Int 66, 663-667 (2004).
69. Puelles V G, Bertram J F, Moeller M J. Quantifying podocyte depletion: theoretical and practical considerations. Cell Tissue Res 369, 229-236 (2017).
70. Puelles V G, Bertram J F. Counting glomeruli and podocytes: rationale and methodologies. Curr Opin Nephrol Hypertens 24, 224-230 (2015).
71. Turkcan S, Richly M U, Bouzigues C I, Allain J M, Alexandrou A. Receptor displacement in the cell membrane by hydrodynamic force amplification through nanoparticles. Biophys J 105, 116-126 (2013).
72. Lazareth H, Henique C, Lenoir 0, et al. The tetraspanin CD9 controls migration and proliferation of parietal epithelial cells and glomerular disease progression. Nat Commun. July 24; 10(1):3303 (2019).

The invention claimed is:

1. A method of treating a glomerulonephritis in a subject in need thereof comprising administering to the subject a therapeutically effective amount of a CD9 inhibitor.

2. The method of claim 1 the glomerulonephritis is an extracapillary proliferative disease.

3. The method of claim 1 wherein the glomerulonephritis a crescentic glomerulonephritis or a focal segmental glomerulosclerosis.

4. The method of claim 1 wherein the CD9 inhibitor is an anti-CD9 antibody that binds to an extracellular domain of CD9.

5. The method of claim 4 wherein the antibody inhibits the binding of CD9 to Integrin beta-1 (ITGB1) and/or CD44.

6. The method of claim 4, wherein the CD9 inhibitor is an anti-CD9 antibody that binds to extracellular loop 1 (EC1) of CD9.

7. The method of claim 4, wherein the CD9 inhibitor is an anti-CD9 antibody that binds to extracellular loop 2 (EC2) of CD9.

* * * * *